US010188238B2

(12) United States Patent
Dammermann et al.

(10) Patent No.: US 10,188,238 B2
(45) Date of Patent: Jan. 29, 2019

(54) BEVERAGE PRODUCTION MACHINES AND METHODS WITH TAMPING ASSEMBLY

(71) Applicant: Starbucks Corporation, Seattle, WA (US)

(72) Inventors: Kurt Philip Dammermann, San Francisco, CA (US); Adam Mekeel Mack, Menlo Park, CA (US); Matthew Thomas James, San Francisco, CA (US); Philipe Roget Manoux, Oakland, CA (US)

(73) Assignee: Starbucks Corporation, Seattle, WA (US)

( * ) Notice: Subject to any disclaimer, the term of this patent is extended or adjusted under 35 U.S.C. 154(b) by 901 days.

(21) Appl. No.: 14/205,241

(22) Filed: Mar. 11, 2014

(65) Prior Publication Data

US 2015/0257579 A1    Sep. 17, 2015

(51) Int. Cl.
*A47J 31/36*    (2006.01)
*A47J 31/40*    (2006.01)
(Continued)

(52) U.S. Cl.
CPC ............ *A47J 31/407* (2013.01); *A23L 2/395* (2013.01); *A23P 10/25* (2016.08);
(Continued)

(58) Field of Classification Search
CPC .. A47J 31/407; A47J 31/3633; A47J 31/0668; A23P 10/25; A23L 2/395; A23V 2002/00
(Continued)

(56) References Cited

U.S. PATENT DOCUMENTS 5,103,716 A    4/1992  Mikkelsen
5,495,793 A    3/1996  Muis et al.
(Continued)

FOREIGN PATENT DOCUMENTS

CA    2260246 A1    7/1999
CA    2490500 A1    6/2005
(Continued)

OTHER PUBLICATIONS

International Search Report and Written Opinion for PCT/US2015/019424 dated Jun. 17, 2015 in 12 pages.

*Primary Examiner* — Ibrahime A Abraham
*Assistant Examiner* — Chris Liu
(74) *Attorney, Agent, or Firm* — Knobbe Martens Olson & Bear LLP

(57) ABSTRACT

A beverage preparation machine for preparing single servings can include a lid assembly that can move between an open configuration and a closed configuration. The machine can also include a basket assembly having a chamber for receiving a cartridge containing a beverage precursor. Additionally, the machine can include a tamping assembly that can move between a latched state and a tamped state. The tamping assembly can include a tamping surface, a tamp spring element, a lid cam connected to the lid assembly, and a collar. The lid cam can include a cam path disposed along a sidewall of the lid cam, and the collar can have one or more cam teeth that can engage the cam path. In the tamped state, the tamping surface can be closer to the basket assembly than in the latched state.

16 Claims, 14 Drawing Sheets

(51) Int. Cl.
　　*A23L 2/395* (2006.01)
　　*A47J 31/06* (2006.01)
　　*A23P 10/25* (2016.01)
(52) U.S. Cl.
　　CPC ....... *A47J 31/0668* (2013.01); *A47J 31/3633* (2013.01); *A23V 2002/00* (2013.01)
(58) Field of Classification Search
　　USPC ......... 99/279, 295, 287, 288, 281, 280, 282, 99/283, 284, 285, 286
　　See application file for complete search history.

(56) References Cited

U.S. PATENT DOCUMENTS

| | | | |
|---|---|---|---|
| 5,657,683 | A | 8/1997 | Sandei et al. |
| 5,957,035 | A * | 9/1999 | Richter .................. A23F 5/26 426/433 |
| 6,095,032 | A | 8/2000 | Barnett et al. |
| 6,129,006 | A | 10/2000 | Schmed |
| 6,634,280 | B2 | 10/2003 | Sowden et al. |
| 6,644,173 | B2 | 11/2003 | Lazaris et al. |
| 6,708,600 | B2 | 3/2004 | Winkler et al. |
| 6,711,988 | B1 | 3/2004 | Eugster |
| 6,948,420 | B2 | 9/2005 | Kirschner et al. |
| 6,978,682 | B2 | 12/2005 | Foster et al. |
| 7,017,474 | B2 | 3/2006 | Comte |
| 7,320,274 | B2 | 1/2008 | Castellani |
| 7,357,071 | B2 | 4/2008 | Geroult et al. |
| 7,377,089 | B2 | 5/2008 | Rapparini |
| 7,621,212 | B2 | 11/2009 | Carbonini |
| 7,685,931 | B2 | 3/2010 | Rivera |
| 7,698,992 | B2 | 4/2010 | Wei |
| 7,766,056 | B2 | 8/2010 | Rapparini |
| 7,775,152 | B2 | 8/2010 | Kirschner et al. |
| 7,849,784 | B2 | 12/2010 | Adler |
| 7,992,486 | B2 | 8/2011 | Constantine et al. |
| 8,176,840 | B2 | 5/2012 | Jarisch |
| 8,191,463 | B2 | 6/2012 | Spinelli |
| 8,230,775 | B2 | 7/2012 | Vanni |
| 8,240,245 | B2 | 8/2012 | Doglioni Majer |
| 8,291,812 | B2 | 10/2012 | Rivera |
| 8,327,754 | B2 | 12/2012 | Kirschner et al. |
| 8,336,186 | B2 | 12/2012 | Bloome et al. |
| 2004/0244599 | A1 * | 12/2004 | Wei .................... A47J 31/0615 99/279 |
| 2005/0172821 | A1 * | 8/2005 | Chen .................. A47J 31/0668 99/279 |
| 2005/0241489 | A1 | 11/2005 | Kirschner et al. |
| 2006/0107841 | A1 | 5/2006 | Schifferle |
| 2006/0123998 | A1 * | 6/2006 | Castellani .......... A47J 31/0673 99/495 |
| 2006/0150822 | A1 | 7/2006 | Wu |
| 2006/0196364 | A1 | 9/2006 | Kirschner |
| 2007/0144356 | A1 | 6/2007 | Rivera |
| 2007/0181005 | A1 | 8/2007 | Kirschner et al. |
| 2008/0038441 | A1 | 2/2008 | Kirschner |
| 2008/0105131 | A1 | 5/2008 | Castellani |
| 2009/0130270 | A1 | 5/2009 | Cortese |
| 2010/0170402 | A1 | 7/2010 | Kirschner |
| 2010/0173056 | A1 * | 7/2010 | Yoakim ................... A47J 31/22 426/433 |
| 2010/0258010 | A1 | 10/2010 | Castellani |
| 2011/0100228 | A1 | 5/2011 | Rivera |
| 2011/0100229 | A1 | 5/2011 | Rivera |
| 2011/0117248 | A1 * | 5/2011 | Rivera ................. A47J 31/085 426/77 |
| 2011/0209623 | A1 * | 9/2011 | Leung .................... A47J 31/44 99/287 |
| 2011/0274802 | A1 | 11/2011 | Rivera |
| 2011/0297002 | A1 | 12/2011 | Vitel et al. |
| 2012/0009304 | A1 | 1/2012 | Perentes et al. |
| 2012/0207895 | A1 | 8/2012 | Rivera |
| 2012/0207896 | A1 | 8/2012 | Rivera |
| 2012/0276264 | A1 | 11/2012 | Rivera |
| 2012/0285333 | A1 | 11/2012 | Doglioni Majer |
| 2012/0297987 | A1 | 11/2012 | Lee et al. |
| 2013/0068108 | A1 * | 3/2013 | Rivera ................. A47J 31/0647 99/287 |
| 2013/0186281 | A1 * | 7/2013 | Guo ........................ A47J 31/36 99/287 |
| 2013/0309041 | A1 * | 11/2013 | Grigoryan ............... F16B 39/12 411/204 |

FOREIGN PATENT DOCUMENTS

| | | |
|---|---|---|
| CA | 2554827 A1 | 8/2005 |
| CA | 2526785 A1 | 5/2006 |
| CA | 2442912 C | 8/2007 |
| CA | 2677859 A1 | 11/2007 |
| CA | 2681638 A1 | 10/2008 |
| CA | 2745286 A1 | 6/2010 |
| CA | 2779263 A1 | 5/2011 |
| CA | 2467617 C | 11/2012 |
| CA | 2655191 C | 9/2014 |
| CA | 2660119 C | 9/2014 |
| CA | 2657960 C | 2/2015 |
| EP | 0419398 B1 | 1/1994 |
| EP | 0627186 B1 | 12/1994 |
| EP | 0937432 B1 | 12/2002 |
| EP | 1126774 B1 | 1/2003 |
| EP | 1217925 B1 | 2/2004 |
| EP | 1532903 A1 | 5/2005 |
| EP | 1535554 | 6/2005 |
| EP | 1669011 A1 | 6/2006 |
| EP | 1674007 A1 | 6/2006 |
| EP | 1552777 B1 | 11/2006 |
| EP | 1768528 A1 | 4/2007 |
| EP | 1682411 B1 | 10/2007 |
| EP | 1658795 B1 | 8/2008 |
| EP | 1658796 B1 | 9/2008 |
| EP | 1774879 B1 | 9/2008 |
| EP | 1987749 A2 | 11/2008 |
| EP | 1859714 B1 | 2/2009 |
| EP | 1707088 B1 | 5/2009 |
| EP | 1883587 B1 | 5/2009 |
| EP | 1886942 B1 | 11/2009 |
| EP | 2137083 A1 | 12/2009 |
| EP | 1867257 B9 | 3/2010 |
| EP | 2185043 A1 | 5/2010 |
| EP | 2201872 A1 | 6/2010 |
| EP | 2240055 A1 | 10/2010 |
| EP | 1906798 B1 | 8/2011 |
| EP | 2107987 B1 | 8/2011 |
| EP | 2378932 A1 | 10/2011 |
| EP | 2380471 A1 | 10/2011 |
| EP | 2394541 A1 | 12/2011 |
| EP | 2019612 B1 | 1/2012 |
| EP | 1648274 B1 | 2/2012 |
| EP | 1993415 B1 | 4/2012 |
| EP | 2004027 B1 | 6/2012 |
| EP | 2140788 B1 | 6/2012 |
| EP | 2493357 A2 | 9/2012 |
| WO | WO 2000/027262 | 5/2000 |
| WO | WO 2001/024670 A3 | 11/2001 |
| WO | WO 2005/016094 | 2/2005 |
| WO | WO 2005/047111 | 5/2005 |
| WO | WO 2005/120957 | 12/2005 |
| WO | WO 2006/003115 | 1/2006 |
| WO | WO 2006/121520 | 11/2006 |
| WO | WO 2006124180 | 11/2006 |
| WO | WO 2007/001579 | 1/2007 |
| WO | WO 2007/105249 | 9/2007 |
| WO | WO 2007/105944 | 9/2007 |
| WO | WO 2007/126608 | 11/2007 |
| WO | WO 2007/135135 | 11/2007 |
| WO | WO 2007/136958 | 11/2007 |
| WO | WO 2007/144749 | 12/2007 |
| WO | WO 2008/015642 | 2/2008 |
| WO | WO 2008/121489 | 10/2008 |
| WO | WO 2009/017927 | 2/2009 |
| WO | WO 2009/043630 | 4/2009 |
| WO | WO 2009/089266 | 7/2009 |
| WO | WO 2010/066705 | 6/2010 |

(56) References Cited

FOREIGN PATENT DOCUMENTS

| | | |
|---|---|---|
| WO | WO 2010/081270 | 7/2010 |
| WO | WO 2011/053890 | 5/2011 |
| WO | WO 2012/045112 | 4/2012 |
| WO | WO 2012/137185 | 10/2012 |
| WO | WO 2012/162588 | 11/2012 |
| WO | WO 2013007779 A1 * 1/2013 .......... A47J 31/0673 |
| WO | WO 2014/056821 | 4/2014 |
| WO | WO 2015/138310 | 9/2015 |

\* cited by examiner

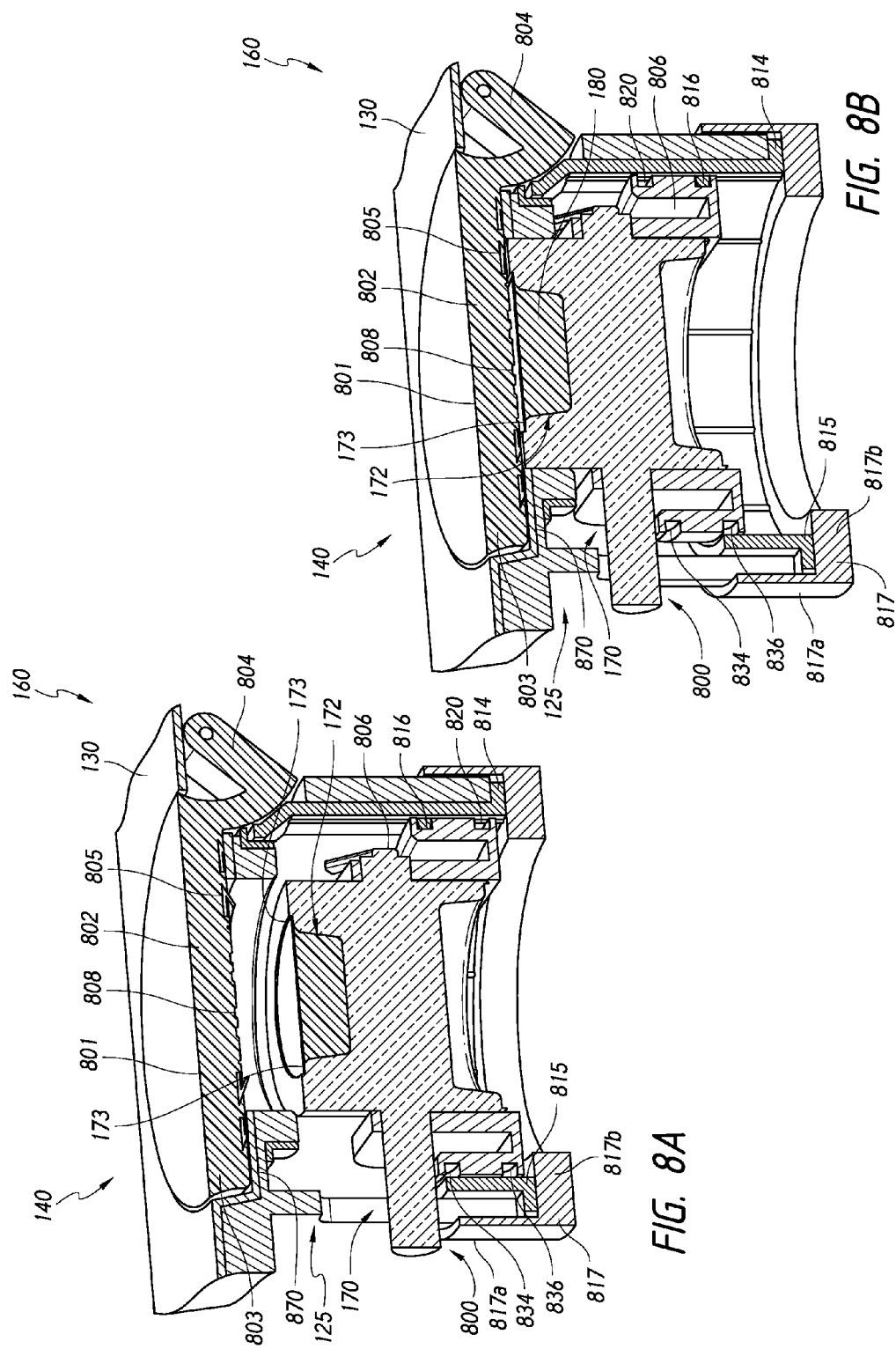

BEVERAGE PRODUCTION MACHINES AND METHODS WITH TAMPING ASSEMBLY

RELATED APPLICATIONS

This application is related to at least U.S. application Ser. No. 14/205,198, titled "SINGLE-SERVE BEVERAGE PRODUCTION MACHINE," which is filed on the same day as the present application; U.S. application Ser. No. 14/205,256 titled "BEVERAGE PRODUCTION MACHINES AND METHODS WITH MULTI-CHAMBERED BASKET UNITS," which is filed on the same day as the present application; U.S. application Ser. No. 14/205 261, titled "CARTRIDGE EJECTION SYSTEMS AND METHODS FOR SINGLE-SERVE BEVERAGE PRODUCTION MACHINES," which is filed on the same day as the present application; U.S. application Ser. No. 14/205,232, titled "BEVERAGE PRODUCTION MACHINES AND METHODS WITH RESTRICTORS," which is filed on the same day as the present application; and U.S. application Ser. No. 14/205,197, titled "POD-BASED RESTRICTORS AND METHODS,"which is filed on the same day as the present application. The entirety of each of the aforementioned applications is hereby incorporated herein by reference.

BACKGROUND

Field

The present disclosure relates to a single-serve beverage machine for producing a beverage.

Description of the Related Art

Single-serve beverage machines are devices that are designed to produce a single serving, or sometimes a single cup, of a desired beverage. In comparison to other types of beverage machines (such as drip coffee makers having a multi-cup carafe), single-serve beverage machines can enhance convenience by reducing the time to prepare the beverage.

Some single-serve beverage machines use a cartridge or capsule containing one or more beverage components or precursors to produce the beverage. Generally, such cartridges are received in the single-serve beverage machine, are used to produce the single serving of the beverage, and are subsequently manually removed from the machine and discarded.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 8A illustrates yet another embodiment of a beverage production assembly with a tamping assembly in a latched state.

FIG. 8B illustrates the beverage production assembly shown in FIG. 8A with the tamping assembly in a tamped state.

DETAILED DESCRIPTION OF CERTAIN EMBODIMENTS

Figure 1A:
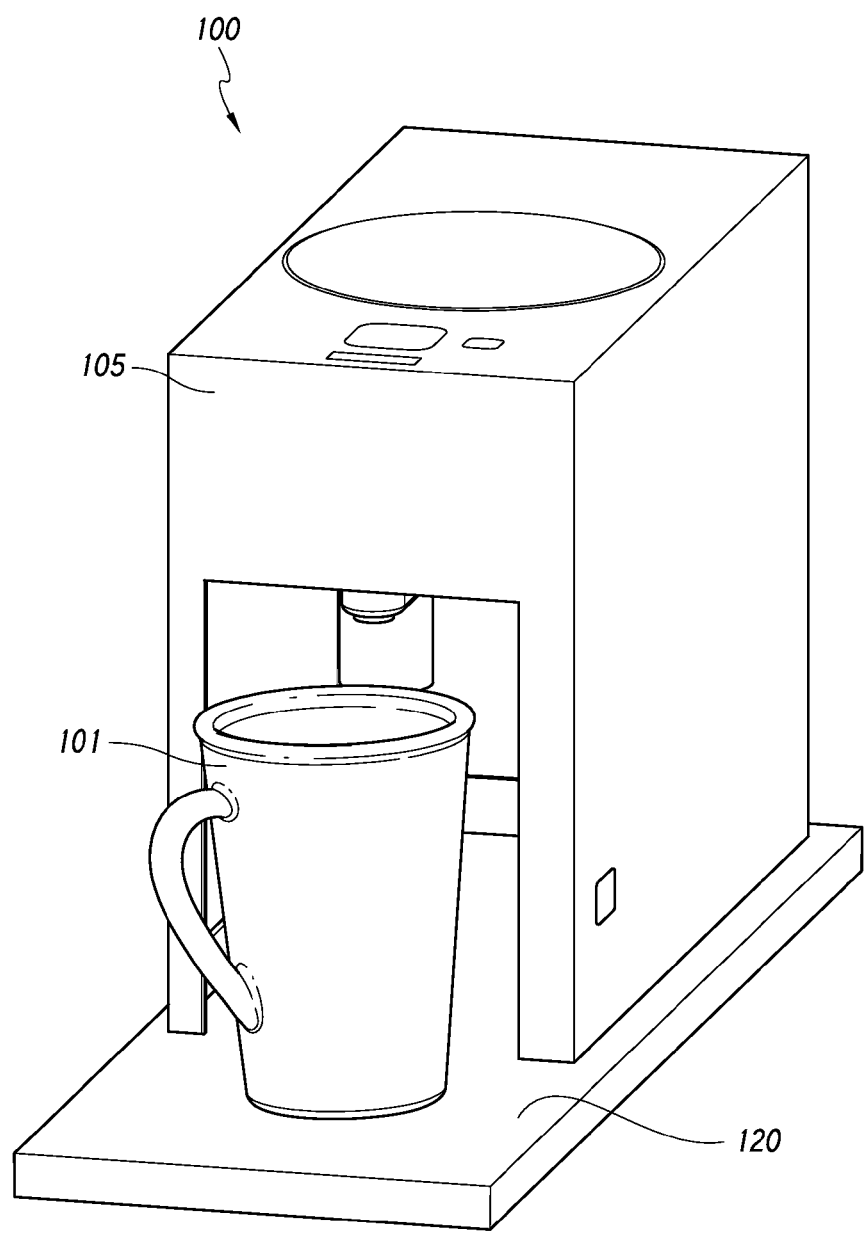
FIG. 1A illustrates an embodiment of a beverage preparation machine including a brewer.

The following discussion is presented to enable a person skilled in the art to make and use one or more of the present embodiments. The general principles described herein may be applied to embodiments and applications other than those detailed below without departing from the spirit and scope of the disclosure. Indeed, the present embodiments are not intended to be limited to the particular embodiments shown, but are to be accorded the widest scope consistent with the principles and features disclosed or suggested herein.

Various embodiments are described below to illustrate various examples that may be employed to achieve one or more desired improvements. These examples are only illustrative and not intended in any way to restrict the general disclosure presented and the various aspects and features of the disclosure. Certain aspects, advantages, and features of the inventions have been described herein. It is not necessary that any or all such aspects, advantages, and features are achieved in accordance with any particular embodiment. Indeed, not all embodiments achieve the advantages described herein, but may achieve different advantages instead. Any structure, feature, or step in one example is contemplated to be used in place of or in addition to any structure, feature, or step of any other example. No features, structure, or step disclosed herein is essential or indispensable.

Introduction

Some beverages precursors (e.g., espresso grounds) can benefit from being compressed (e.g., tamped) prior to the brewing process. For example, espresso can benefit from being compressed prior to brewing to maximize flavor extraction. Accordingly, some aspects of the present disclosure describe a tamping assembly that can compress the beverage component or precursor. Some implementations of the tamping assembly can provide a tamp force between about 30 lbf and about 50 lbf.

Certain aspects of the disclosure are directed toward a machine for preparing single-servings of a beverage. The machine can include a lid assembly that can move between an open configuration and a closed configuration. The machine can also include a basket assembly having a chamber for receiving a cartridge containing a beverage precursor. Additionally, the machine can include a tamping assembly that can move between a latched state and a tamped state. The tamping assembly can include a lid cam, a collar, and a tamping surface. The lid cam can be connected to the lid assembly and can include an upper wall portion, a sidewall, and a cam path disposed along the sidewall. The collar can include one or more cam teeth that can engage the cam path. In the tamped state, the tamping surface can be closer to the basket assembly than in the latched state. In certain aspects, the tamping assembly can include a single tamp force spring or an array of tamp force springs to preload the tamping surface with a predetermined force. A retaining plate with screws can be used to secure the one or more tamp force springs.

In the above mentioned machine aspect, the lid cam can translate axially relative to the lid assembly by at least one lid spring. For example, the lid cam can be suspended by the at least one lid spring. In the tamped state, the collar can drive the lid cam away from the lid assembly by stretching the at least one lid spring. Alternatively, the collar can drive the lid cam away from the lid assembly by compressing the at least one lid spring.

In any of the above mentioned machine aspects, the cam path can include a lower cam path and an upper cam path. In certain aspects, when the tamping assembly is in the latched state, one or more cam teeth can engage the lower cam path. Further, in the tamped state, the one or more cam teeth can engage the upper cam path. The cam path can control the axial position of the lid cam based on the rotational state of the collar.

In any of the above mentioned machine aspects, the collar can include a plurality of geared teeth. A motor can engage the plurality of geared teeth to rotate the collar.

In any of the above mentioned machine aspects, the cam path can be disposed along an outer surface of the sidewall of the lid cam, and the cam teeth can extend radially inward from an inner surface of the collar. In other configurations, the cam path can be disposed along an inner surface of the side wall of the lid cam, and the cam teeth can extend radially outward from an outer surface of the collar.

In any of the above mentioned machine aspects, the lid cam can include a ledge on a bottom surface of the upper wall portion. The ledge can form a seal with the basket assembly. When a cartridge is disposed in the basket assembly, an annular rim of the cartridge can form an elastomeric seal between the ledge and the basket assembly. In certain variants, the lid cam forms a seal against an outer wall of the basket assembly.

In any of the above mentioned machine aspects, the lid cam can include one or more ribs projecting radially outward from the upper wall portion of the lid cam. The ribs provide a surface for the one or more lid springs to react against in order to restore the lid cam from the tamped state to the latched state.

In any of the above mentioned machine aspects, the tamping assembly can include a tamp spring disposed between the tamping surface and the lid assembly. In the tamped state, the tamp spring can be in a compressed state. In certain aspects, the spring can apply a force between about 30 lbf and about 50 lbf on the beverage precursor.

In any of the above mentioned machine aspects, the tamping surface can be a shower head with any configuration of fluid outlet shapes, sizes, and array patterns. Further, the lid cam can include one or more fluid outlets.

Certain aspects of the disclosure are directed toward a method of compressing a beverage precursor in a beverage preparation machine. The method can include moving a lid assembly from an open configuration to a closed configuration; engaging one or more cam teeth disposed on a collar with a cam path on a lid cam; and moving a tamping assembly from a latched state to a tamped state. Moving the tamping assembly from the latched state to the tamped state can include rotating the collar such that the one or more cam teeth move along the cam path of the lid cam from a lower cam path to an upper cam path; moving the lid cam away from the lid assembly; and moving a tamping surface toward the beverage precursor.

In the above mentioned method aspect, rotating the collar can include driving a plurality of geared teeth disposed on the collar using a motor.

In any of the above mentioned method aspects, moving the lid cam away from the lid assembly can include pulling at least one spring from a compressed state to an elongated state. In certain variants, the lid spring moves from one compressed state to another compressed state.

In any of the above mentioned method aspects, moving the tamping surface can include compressing a spring disposed between the tamping surface and the lid assembly. In certain aspects, the tamping surface moves less than or equal to about 5.0 mm. In certain aspects, moving the tamping surface comprises providing a force between about 30 lbf and about 50 lbf to the beverage precursor.

In any of the above mentioned method aspects, the lid assembly can remain stationary when moving the tamping assembly from the latched state to the tamped state.

Certain aspects of the disclosure are directed toward a machine for preparing single-servings of a beverage. The machine can include a lid assembly configured to move between an open configuration to allow insertion of a beverage precursor cartridge into a chamber of the machine and a closed configuration to close the chamber. The lid assembly can include a movable tamping member with a tamping surface. The machine can also include an actuator (e.g., collar) that can couple to the lid assembly when the lid assembly is in the closed configuration. The actuator can move the tamping member into a tamping position relative a surface of the cartridge so that the tamping surface is closer to a bottom of the chamber in the tamping position than in an untamped position.

In the above mentioned machine aspect, the lid assembly can include a lid cam having an upper wall portion, a sidewall, and a cam path disposed along the sidewall. Further, the actuator can include a collar having one or more cam teeth configured to engage the cam path.

In any of the above mentioned machine aspects, the lid assembly can translate axially when the tamping surface is moved into the tamping position. For example, the lid assembly can include a hinge that can translate axially when the tamping surface is moved into the tamping position. In alternative configurations, the lid assembly can be stationary when the tamping surface is moved into the tamping position. For example, the tamping surface can move relative to the lid assembly using one or more springs.

In any of the above mentioned machine aspects, the movable tamping member can be spring-loaded.

System Overview

Figure 1B:
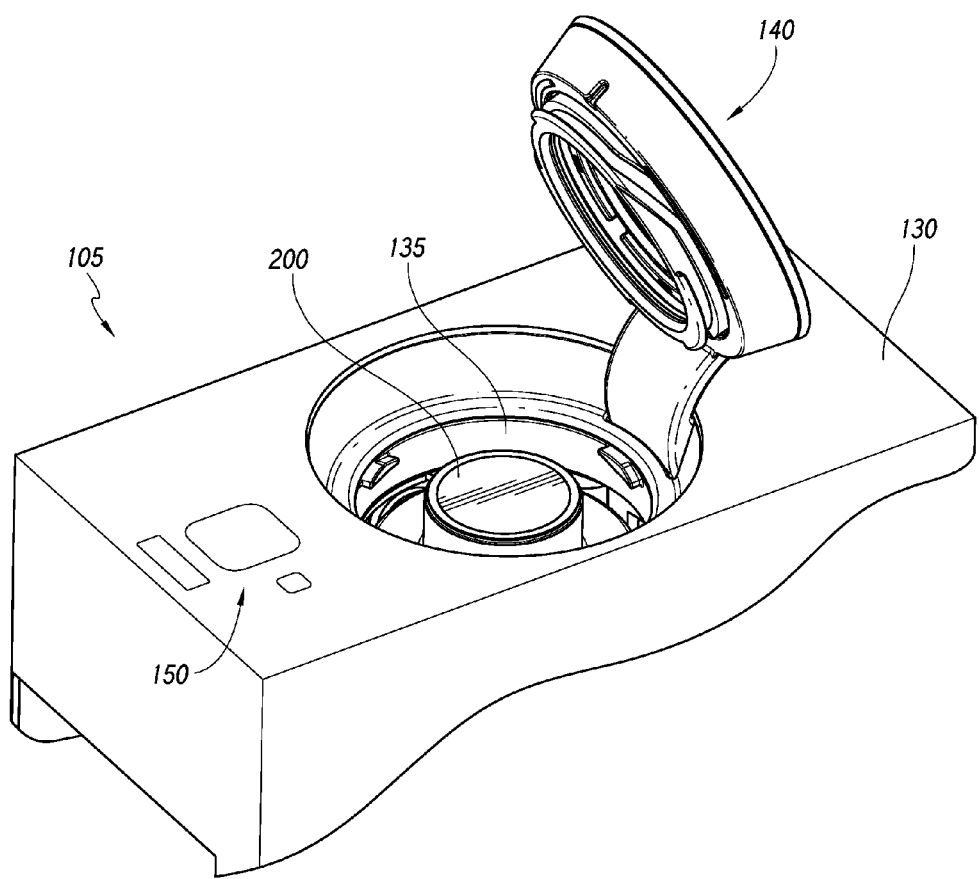
FIG. 1B illustrates a top perspective view of an upper portion of the beverage preparation machine of FIG. 1A, with a lid in an open position and a cartridge received in the brewer.

FIG. 1A illustrates a perspective view of an embodiment of a beverage preparation machine 100 that can dispense a beverage into a cup or other vessel 101. The beverage preparation machine 100 can include a brewer 105. In some embodiments, one or more of the components of the beverage preparation machine 100 are housed on and/or partially in a tray 120. As shown in FIG. 1B, an upper portion of the brewer 105 can include a top with an opening to facilitate the loading of a single-serving beverage cartridge (e.g., a single-serve cartridge) into the basket assembly 170 (see FIG. 1C).

The beverage preparation machine 100 can include a liquid reservoir within the brewer 105 or external to the brewer 105. For example, the liquid reservoir can be external to the brewer 105 and in fluid communication (e.g., via tubing or pipes) with the brewer 105 to provide liquid (e.g., water) stored within the liquid reservoir to a chamber within the brewer 105 where the beverage is prepared. In various embodiments, the liquid is pre-heated before entering the chamber. For example, the liquid may be heated within a separate storage reservoir or within fluid supply lines as the liquid travels to the chamber. The amount of liquid (e.g., water) provided to the chamber from the liquid reservoir may be determined by the beverage recipe. The liquid reservoir may include a water level sensor that can determine whether enough liquid is present in the liquid reservoir to prepare a requested beverage. In some embodiments, the beverage preparation machine 100 can include a frother unit (not shown) that can froth a liquid (e.g., frothed milk). After dispensing a brewed beverage into the cup 101, the frothed liquid (e.g., frothed milk) can be poured into the beverage. The frother unit may include a control input to toggle the frothing on and off.

Figure 1C:
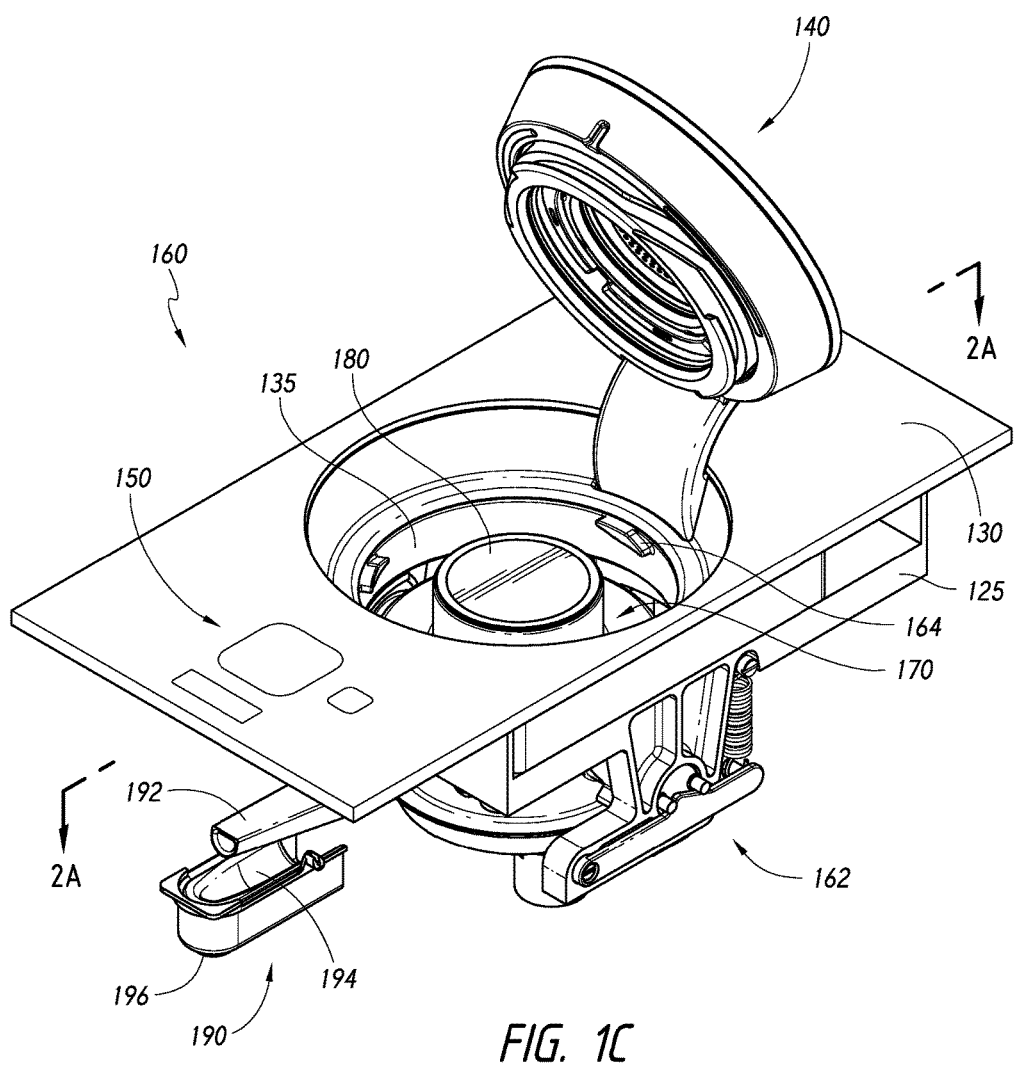
FIG. 1C illustrates a top perspective view of the beverage production assembly of FIG. 1B with the frame hidden.
Figure 2A:
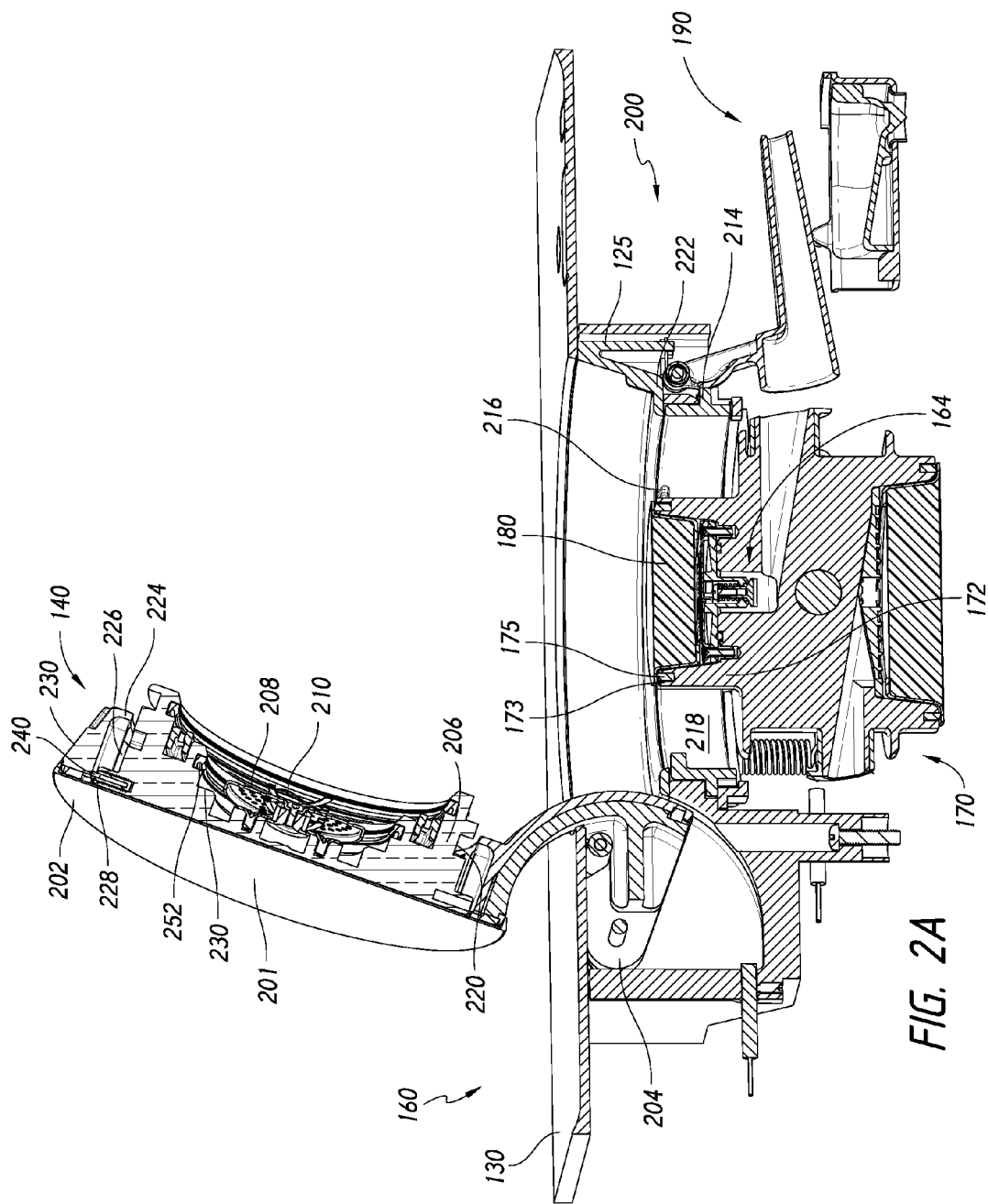
FIG. 2A illustrates a cross-section of the beverage production assembly of FIG. 1C through line 2A-2A with a tamping assembly in an unlatched state.

As shown in FIGS. 1C and 2A, the brewer 105 can include a frame 125 that supports a beverage production assembly 160 having a brew basket assembly 170. As also shown, an upper portion of the brewer 105 can include a top 130 with an opening 135 to facilitate the loading of a single-serving beverage cartridge 180 (e.g., a single-serve cartridge with a porous upper and/or lower surface) into the basket assembly 170. The opening 135 can be selectively opened and closed with a lid assembly 140. Additional details regarding single-serve beverage cartridge 180 are disclosed in U.S. application Ser. No. 14/191,225, titled STRETCHABLE BEVERAGE CARTRIDGES AND METHODS, filed Feb. 26, 2014, and U.S. application Ser. No. 14/205 197, titled "POD-BASED RESTRICTORS AND METHODS,"filed on the same day as the present application, the entirety of both of which is hereby incorporated by reference and should be considered a part of this specification.

in various embodiments, the brewer 105 includes an input and output unit 150. For example, the input and output unit 150 can include an indicator (e.g., a light, display, dial, or otherwise) to indicate status information, such as whether the brewer 105 has power, is operating, requires maintenance, etc. The input and output unit 150 can include a user-interface member (e.g., a button or switch) to provide instruction to the brewer 105, such as a command to begin the beverage production process. The input and output unit 150 can be connected with a memory and/or a controller, such as a microprocessor.

In some variants, the input and output unit 150 includes a reader. The reader can read a code (e.g., optical code, bar code, quick response (QR) code, etc.) and/or a tag (e.g., an radio frequency identification (RFID) tag) on the cartridge or associated packaging. This can allow the brewer 105 to identify the type of beverage to be produced and whether a tamping mechanism, such as the tamping mechanisms described herein, are to be actuated for the preparation of the beverage that is identified. For example, reading a cartridge containing espresso coffee grounds can identify to the brewer 105 that an espresso beverage is to be produced. In several implementations, the beverage production assembly 160 is adjusted based on the type of beverage to be produced, as is discussed in more detail below. Additional details regarding the reader are disclosed in U.S. application Ser. No. 14/205 198, titled "SINGLE-SERVE BEVERAGE PRODUCTION MACHINE,"filed on the same day as the present application, the entirety of which is hereby incorporated by reference and should be considered a part of this specification.

In some implementations, when the cartridge 180 has been loaded into the basket assembly 170 and the lid assembly 140 has been closed, a beverage preparation process can begin. In some embodiments of the beverage preparation process, liquid (e.g., hot water) is introduced into the cartridge 180 to produce a beverage. The beverage can exit the cartridge 180 and be conveyed through portions of the brewer 105 to the cup 101. For example, the beverage can be conveyed through a dispensing assembly 190. In some embodiments the dispensing assembly 190 includes a pivoting member 192, a catch member 194, and a dispensing nozzle 196.

As noted above and shown in FIGS. 1C and 2A, the beverage production assembly 160 can include the brew basket assembly 170. The beverage production assembly 160 can also include a ratchet assembly 162 and a collar 214. Engagement between the ratchet assembly 162 and the collar 214 can facilitate movement (e.g., rotation) of the basket assembly 170. The basket assembly 170 can be selectively positioned to provide access to a desired chamber in the basket assembly 170, such as for loading a cartridge. Additional details regarding the basket assembly 170 are disclosed in U.S. application Ser. No. 14/205 256, titled "BEVERAGE PRODUCTION MACHINES AND METHODS WITH MULTI-CHAMBERED BASKET UNITS," filed on the same day as the present application, the entirety of which is hereby incorporated by reference and should be considered a part of this specification.

In some embodiments, a restriction assembly 164 can be positioned in the basket assembly 170 (see FIG. 2A). The restriction assembly 164 can be configured to facilitate creating or providing an increase in pressure in one or more of the chambers of the basket assembly 170 during the beverage production process. This can be beneficial in producing certain types of beverages. For example, producing espresso at under elevated pressure conditions (e.g., about at least 9 bar) can yield an improved beverage. Additional details regarding restriction assemblies can be found in U.S. application Ser. No. 14/205 232, titled "BEVERAGE PRODUCTION MACHINES AND METHODS WITH RESTRICTORS," filed on the same day as the present application, the entirety of which is hereby incorporated by reference and should be considered a part of this specification.

In some embodiments, rotation of the basket assembly 170 can aid in ejecting or otherwise removing a used or unwanted cartridge from the basket assembly 170. More details about cartridge ejection mechanisms and features can be found in U.S. application Ser. No. 14/205 261, titled "CARTRIDGE EJECTION SYSTEMS AND METHODS FOR SINGLE-SERVE BEVERAGE PRODUCTION MACHINES," filed on the same day as the present application, the entirety of which is hereby incorporated by reference.

Translating Lid Cam

Figure 2B:
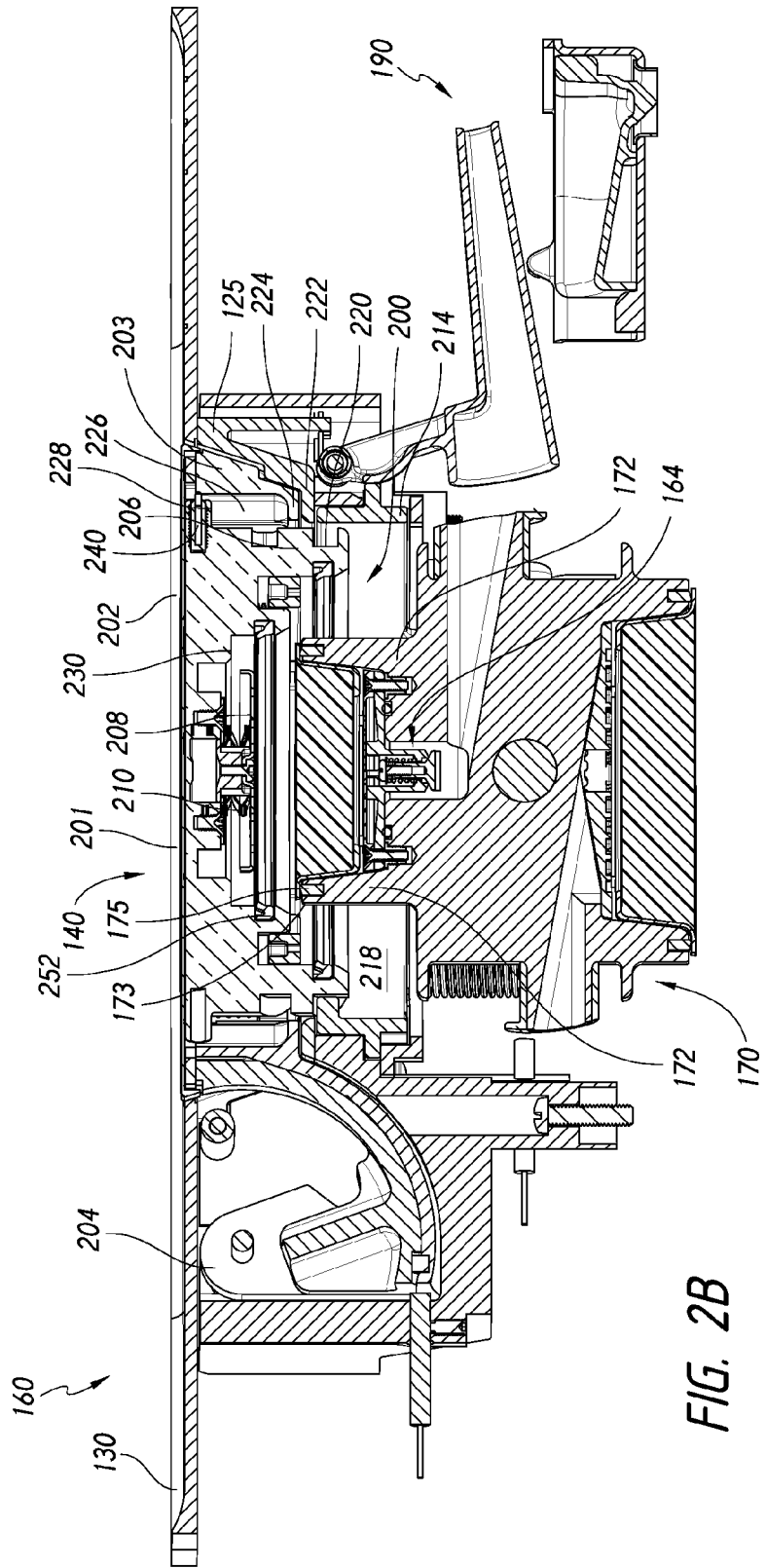
FIG. 2B illustrates the beverage production assembly shown in FIG. 2A with the tamping assembly in a latched state.
Figure 2C:
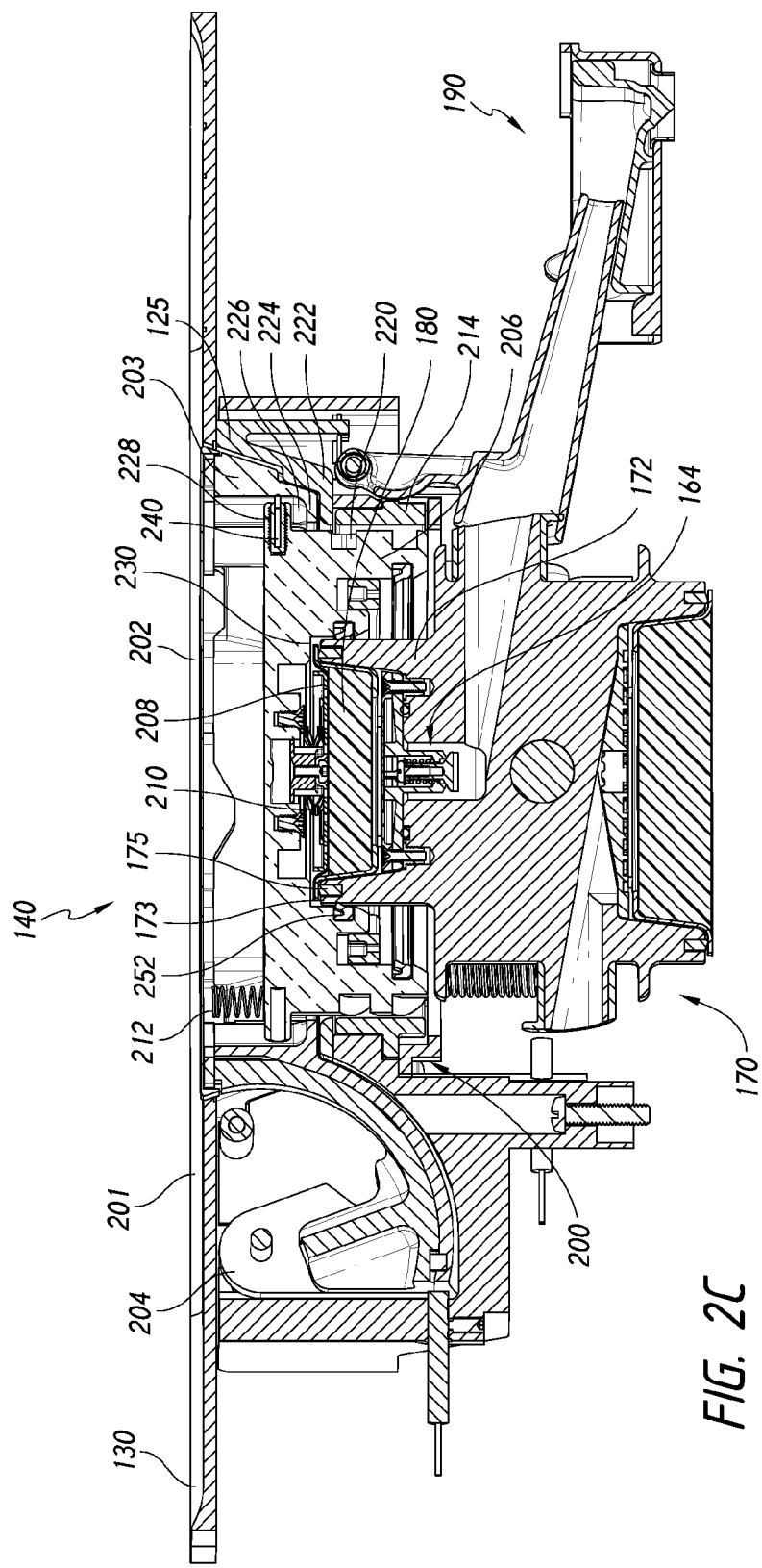
FIG. 2C illustrates the beverage production assembly shown in FIG. 2A with the tamping assembly in a tamped state.

As discussed in greater detail below, FIGS. 2A-2C illustrate an embodiment of a tamping assembly 200 that can be used to compress a beverage precursor contained in a cartridge 180. FIG. 2A illustrates a beverage production assembly 160 with the lid assembly 140 in an open position and the tamping assembly 200 in an unlatched state. As shown in FIG. 2B, the lid assembly 140 can move about a hinge 204 to a closed position in which an upper wall 201 of the lid portion 202 can be generally flush with a top portion 130 of the beverage preparation machine 100. In some embodiments, the lid portion 202 can be biased to the open position, for example, using a torsion spring (e.g., coupled to the hinge 204).

When the lid assembly 140 is in the closed position, a sensor (not shown) (e.g., an optical sensor, a mechanical switch, or a proximity sensor) can detect the presence of the lid portion 202 (e.g., a front edge of the lid) to activate the tamping assembly 200. In some embodiments, when the lid assembly 140 is in the closed position, a latch (not shown) can engage a detent on the front edge of the lid portion 202.

As described in further detail below, once the tamping assembly 200 is activated, a motor 182 (see FIG. 2A) can drive a collar 214 to engage a lid cam 206 (see FIG. 2B). The tamping assembly 200 may remain in this latched state if a beverage is being brewed that does not require tamping, such as brewed coffee. However, if the beverage preparation machine 100 is being used to brew espresso (or a different beverage requiring tamping), the motor 182 can continue to rotate the collar 214, which in turn can move the lid cam 206 to a tamped state in which a tamping surface 208 (e.g., shower head) compresses the beverage precursor contained in the cartridge 180 (see FIG. 2C) by pressing against the lid of the cartridge 180.

As shown in FIGS. 2A-2C, the tamping assembly 200 can generally include a collar 214 capable of engaging a lid cam 206. The lid cam 206 can fixedly (e.g., by welding or screws) or movably (e.g., by springs) engage the lid assembly 140, while the collar 214 can be supported by a framework 125 generally surrounding at least a portion of the basket assembly 170. Additionally, a tamping surface 208 (e.g., a shower head) can be connected to the lid cam 206. A tamping spring 210 can provide the necessary force for the tamping surface 208 to compress a beverage precursor stored in the basket assembly 170.

Figure 3A:
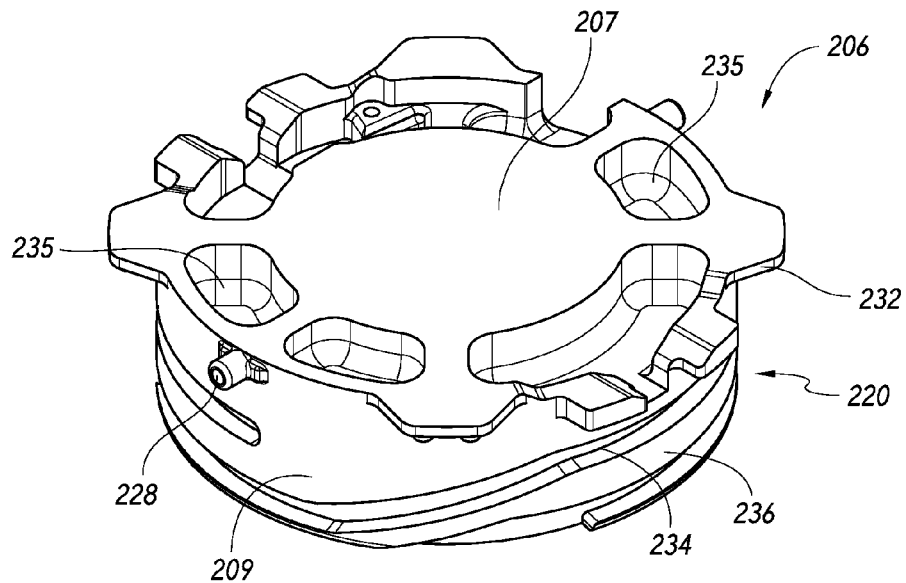
FIG. 3A illustrates a top perspective view of a lid cam that can be used in the tamping assembly shown in FIG. 2A.
Figure 3B:
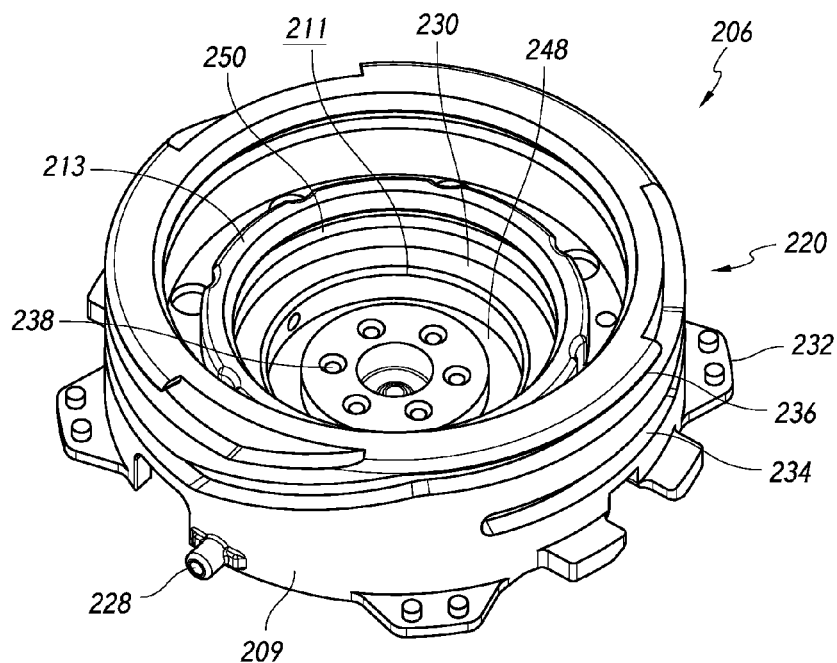
FIG. 3B illustrates a bottom perspective view of the lid cam shown in FIG. 3A.

FIGS. 3A and 3B illustrate different views of the lid cam 206. The lid cam 206 can have a generally cylindrical body with an upper wall portion 207 and a sidewall 209. The upper wall portion 207 can include a number of projections 232 extending radially outward from the lid cam 206. The upper wall portion 207 can also define a number of recesses 235 along an upper surface of the upper wall portion 207. The recesses 235 can receive one or more lid springs 212 extending from the lid cam 206 to the lid portion 202 (see FIG. 2C).

As shown in FIG. 3B, a bottom surface of the upper wall portion 207 can include a number of fluid outlets 238 (e.g., two, four, six, or more) for introducing fluid through the tamping surface 208. The fluid outlets 238 can be positioned in a ring configuration or otherwise symmetrical configuration.

The lid cam 206 can also include an annular ledge 230 surrounding the fluid outlets 238. As shown in FIG. 2C, when tamping assembly 200 is in the tamped state, the ledge 230 can form a seal with the cartridge 180 and/or chamber 172. In some embodiments, the cartridge 180 can have an outer rim that can act as an elastomeric gasket between the lid cam 206 and the chamber 172. As shown in FIG. 2A, an upper rim 173 of the chamber 172 can be generally flat such that the outer rim of cartridge can be easily sealed between the ledge 230 and the upper rim 173. In some embodiments, an elastomeric seal 175 can be positioned along an upper portion of the chamber 172 such that the seal 175 is flush with the upper rim (see FIG. 2A). Advantageously, the seal formed between the lid cam 206 and the chamber 172 can prevent fluid from flowing out of the chamber 172 or around the cartridge 180, rather than through the cartridge 180.

Additionally, a tamp spring 210 can be disposed in an annular channel 248 positioned between the fluid outlets 238 and annular ledge 230 (see FIG. 3B). The tamp spring 210 can be generally aligned with (e.g., extend about) a longitudinal axis of the tamping assembly 200 when the tamping assembly 200 is in a latched state or a tamped state. Although not shown, in other embodiments, the tamping assembly 200 can include multiple tamp springs 210. In other embodiments, the one or more tamp springs can be contained within and/or around the brew basket 170 (e.g., below the cartridge containing the beverage precursor). The lid cam can drive the tamping surface toward the cartridge and can transfer compressive force to the cartridge by translating the cartridge axially down onto the tamp spring(s).

As shown in FIG. 3B, an annular projection 213 can extend from a bottom surface of the upper wall portion 207 and surround the fluid outlets 238. The annular projection 213 can extend further than the ledge 230. As shown in FIGS. 2B and 2C, when the tamping assembly 200 is in the latched or tamped state, the annular projection 213 can surround a chamber 172 of the basket assembly 170. In some embodiments, the annular projection 213 can include an annular channel 250 along an inner portion of the annular projection 213 for receiving an sealing member 252 (e.g., O-ring) to form a seal between the lid cam 206 and the chamber 172 (see FIG. 2C).

Further, the sidewall 209 of the lid cam 206 can define a generally hollow chamber 211 for receiving a cartridge 180 and/or the chamber 172 when the tamping assembly 200 is in a latched or tamped state (see FIGS. 2B and 2C). A number of tubular projections 228 can extend from the sidewall 209. The tubular projections 228 can each house a spring plunger 240 that can be used to center the lid cam 206 relative to the lid assembly 140.

The sidewall 209 can also define a cam path 220 along an exterior surface of the sidewall 209. The cam path 220 can include an upper cam path region 234 (e.g., for tamped state) and a lower cam path region 236 (e.g., for latched state). For example, as shown in FIGS. 3A and 3B, the cam path 220 can have a helical path. Although a single cam path 220 is illustrated, multiple cam paths can be imagined for use with a collar having axially displaced cam teeth. Further, in some embodiments, as shown in FIG. 2A, the lid cam 206 can extend further than the lower flange 224 of the lid portion 202. However, in other embodiments, the sidewall 203 of the lid portion 202 can extend further downward such that the cam path 220 is fully shrouded.

Figure 4A:
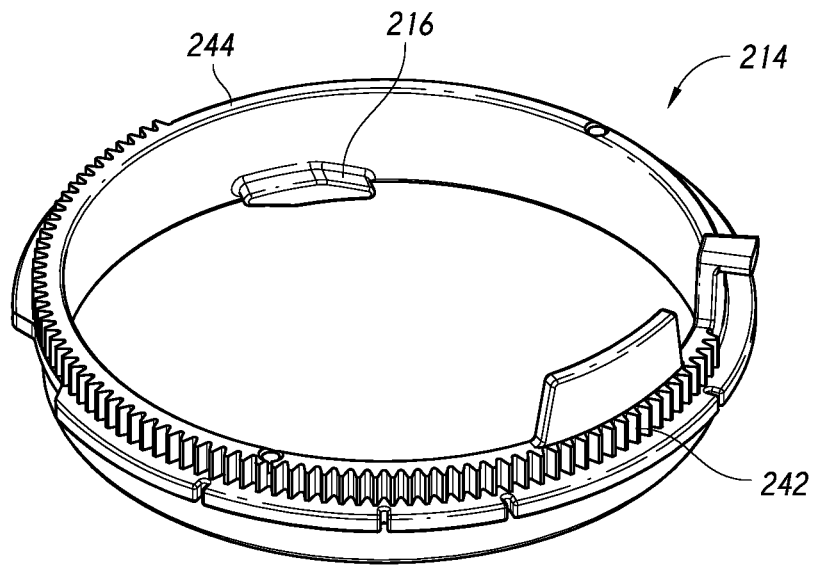
FIG. 4A illustrates a bottom perspective view of a collar that can be used in the tamping assembly shown in FIG. 2A.
Figure 4B:
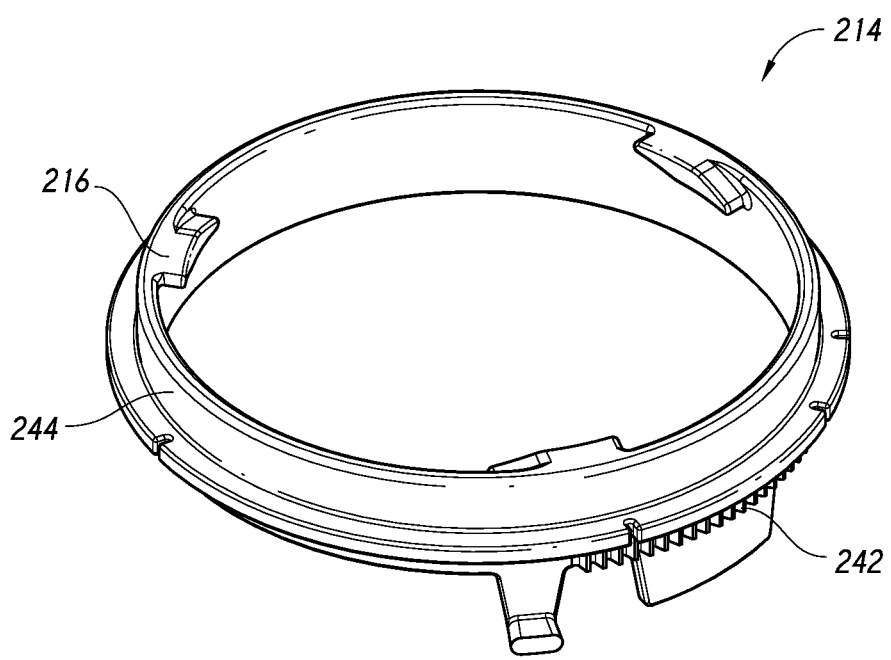
FIG. 4B illustrates a top perspective view of the collar shown in FIG. 4A.

FIGS. 4A and 4B illustrate different perspectives of a collar 214 that can be generally supported by a framework 125 (see FIG. 1C) and can surround the chamber 172 (see FIGS. 2A-2C). The collar 214 can include an annular body 244 and a number of cam teeth 216 (e.g., one, two, three, or more) for engaging the cam path 220 of the lid cam 206. The cam teeth 216 can project radially inward from an upper portion of the annular body 244. As shown in FIG. 4B, the collar 214 can include three cam teeth 216 distributed evenly around the annular body 244. Further, the collar 214 can include a multiple number of geared teeth 242 projecting radially outward from a lower portion of the annular body 244. The geared teeth 242 can surround at least a portion of the annular body 244 (e.g., at least about 50%, at least about 60%, at least about 70%, at least about 80%, or at least about 90% of the annular body 244). The motor 182 (see FIG. 2A) can interact with the geared teeth 242 (e.g., via a gear on an output shaft of the motor 182) to rotate the collar 214 about a longitudinal axis of the tamping assembly 200 in either a clockwise or counterclockwise direction. For example, the motor 182 can rotate the collar 214 at least about 90 degrees and/or less than or equal to about 360 degrees, for example, between about 90 degrees and 120 degrees or between about 120 degrees and 150 degrees, such as about 140 degrees in either direction.

Various methods of forming the lid cam 206 and collar 214 are contemplated. For example, the lid cam 206 can be formed by a molding process, such as injection molding. Further, the lid cam 206 can be constructed from a plastic material, such as Delrin.

Referring back to FIG. 2A, in the unlatched state, the lid cam 206 abuts (or nearly abuts) the upper wall 201 of the lid portion 202. As more clearly shown in FIG. 2C, at least one lid spring 212 (e.g., one, two, three, four, or more) can extend from the lid cam 206 to the lid portion 202. In the unlatched state, the at least one lid spring 212 can remain in a compressed state such that the lid cam 206 generally abuts the upper wall 201 of the lid portion 202. Further, as shown in FIG. 2A, the tamp spring 210 can be positioned between the lid cam 206 and the tamping surface 208. In the unlatched state, the tamp spring 210 can remain in an uncompressed state.

Moving the lid assembly 140 from the open configuration to the closed configuration can move the tamping assembly 200 from the unlatched state to the latched state. As shown in FIG. 2B, in the latched state, the at least one lid spring 212 remains in the compressed state, and the tamp spring 210 remains in the uncompressed state. In the latched state, the lower flange 224 of the lid portion 202 can contact and form a seal with a ledge 222 of a framework 125. Further, the one or more cam teeth 216 can engage the lower cam path 236.

As the tamping assembly 200 moves to the tamped state (see FIG. 2C), the cam teeth 216 move from the lower cam path 236 to the upper cam path 234. The rotation of the collar 214 can pull the lid cam 206 downward into a collar passageway 218 defined by the collar 214 and the basket chamber 172. Further, as the lid cam 206 moves downward, the projections 232 move through a lid passageway 226 formed between the lid cam 206 and the sidewall of the lid portion 203. In certain aspects, the collar passageway 218 and the lid passageway 226 can be generally annular.

As the lid cam 206 moves downward, the at least one lid spring 212 moves to an elongate state (e.g., moves into tension) to separate the lid cam 206 from the lid 202. As such, the lid cam 206 translates in a vertical direction, while the lid portion 202 remains stationary. Further, as the lid cam 206 moves downward, the tamp spring 210 is also compressed causing the tamping surface 208 to tamp the cartridge 180 or beverage precursor. In the tamped state, the projections 232 can contact the lower flange 224 of the lid portion 202, and the ledge 230 can form a seal with the cartridge 180 and/or chamber 172.

The tamp spring 210 can determine the force applied to the beverage precursor. For example, the tamp spring 210 can provide a force of at least about 30 lbf and/or less than or equal to about 50 lbf, such as about 35 lbf, 40 lbf, or 45 lbf. The tamp spring 210 can provide the force over a tamp distance of less than or equal to about 10 mm, such as less than or equal to about 5 mm (e.g., about 5 mm, 4 mm, 3 mm, 2 mm, or 1 mm).

Although the tamping mechanism 200 described above utilizes a lid cam 206 having a cam path 220 and a collar 214 having cam teeth 216, in an alternate configuration, the lid cam 206 can include a number of cam teeth, while the collar 214 can define the cam path. Further, although FIGS. 3A-4B illustrate a particular embodiment of the lid cam 206 and the collar 214, in an alternative configuration, the cam path 220 can be disposed along an inner wall of the lid cam 206, and the cam teeth 216 can extend radially outward from the collar 214.

Translating Lid Assembly

With reference to FIGS. 5A-7C, another illustrative embodiment of a tamping assembly 500 is shown. The tamping assembly 500 resembles or is identical to the tamping assembly 200 discussed above in many respects. Accordingly, numerals used to identify features of the tamping assembly 200 are incremented by three hundred (300) to identify like features of the tamping assembly 500. This numbering convention generally applies to the remainder of the figures. Any component or step disclosed in any embodiment in this specification can be used in other embodiments.

Figure 5A:
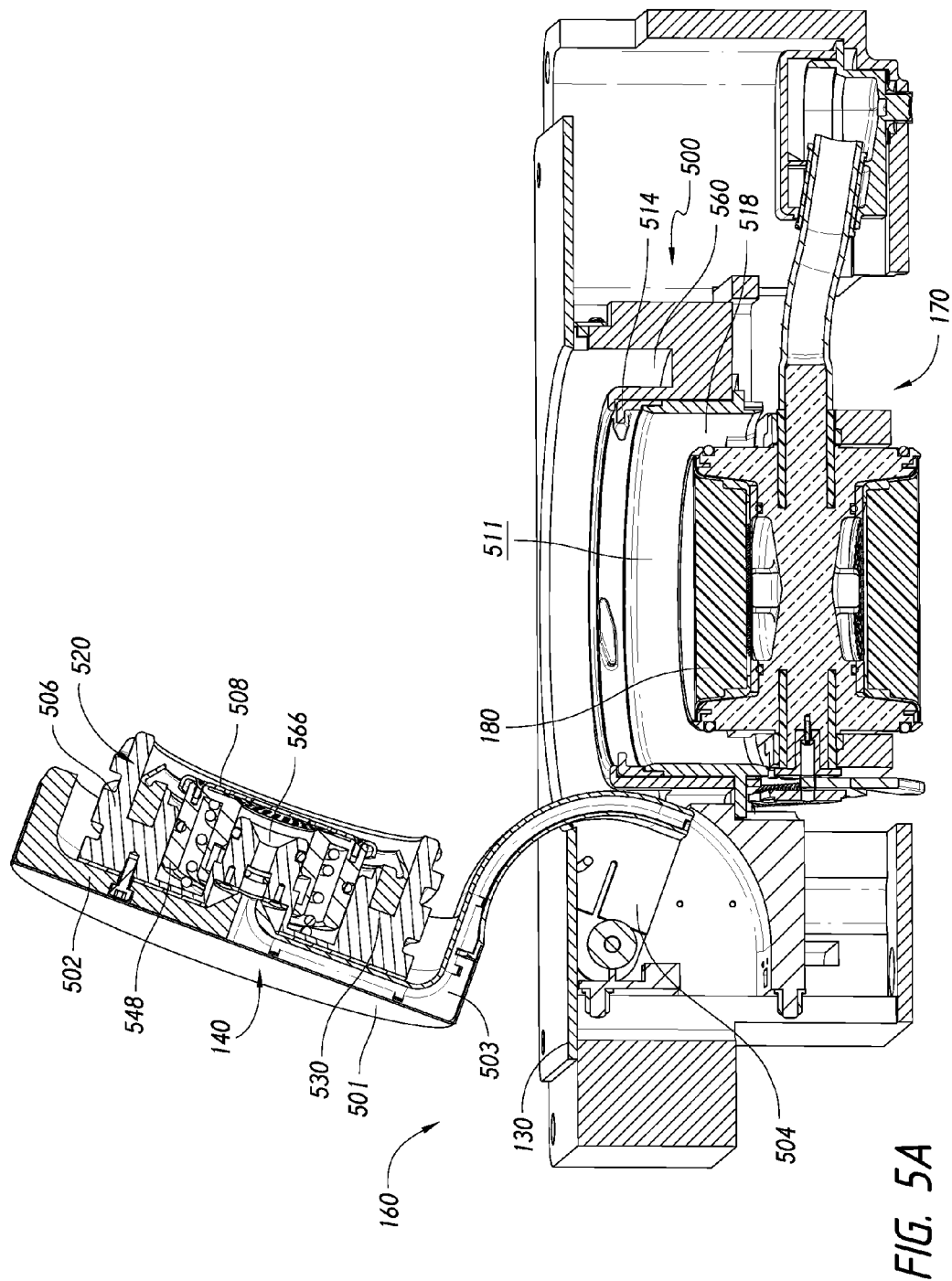
FIG. 5A illustrates a cross-section of another embodiment of the beverage production assembly with a tamping assembly in a latched state.

FIG. 5A illustrates another embodiment of a tamping assembly 500 that can be used to compress a beverage precursor contained in a cartridge 180. FIG. 5A illustrates a beverage production assembly 160 with the lid assembly 140 in a closed position and a tamping assembly 500 in a latched state. The lid assembly 140 can move about a hinge 504 to a closed position in which the lid assembly 140 is generally vertically aligned with the basket assembly 170. In some embodiments, the lid portion 140 can be biased to the open position, for example, using a torsion spring (e.g., coupled to the hinge 504).

When the lid assembly 140 is in the closed position, a sensor (not shown) (e.g., an optical sensor, a mechanical switch, or a proximity sensor) can detect the presence of the lid portion 502 (e.g., a front edge of the lid) to activate the tamping assembly 500. In some embodiments, when the lid assembly 140 is in the closed position, a latch (not shown) can engage a detent on the front edge of the lid portion 502.

Once the tamping assembly 500 is activated, a motor 182 (see FIG. 2A) can drive a collar 514 to engage a lid cam 506. The tamping assembly 500 may remain in this latched state if a beverage is being brewed that does not require tamping, such as brewed coffee. However, if the beverage preparation machine 100 is being used to brew espresso (or a different beverage requiring tamping), the motor 182 can continue to rotate the collar 514 which in turn can move the lid cam 506 to a tamped state in which a tamping surface 508 (e.g., shower head) compresses the beverage precursor contained in the cartridge 180.

As shown in FIG. 5A, the tamping assembly 500 can generally include a collar 514 capable of engaging a lid cam 506. The lid cam 506 can fixedly (e.g., by welding or screws) engage the lid assembly 140, while the collar 514 can be supported by a framework 125 generally surrounding at least a portion of the basket assembly 170. In some embodiments, as shown in FIG. 5A, the lid cam 506 can extend further downward than the sidewall of the lid portion 503. However, in other embodiments, the sidewall 503 can extend further downward such that the lid cam 506 is fully shrouded. Additionally, a tamping surface 508 (e.g., a shower head) can be connected to the lid cam 506. A tamping spring 510 can be positioned between the tamping surface 508 and the lid portion 502 and can provide the necessary force for the tamping surface 508 to compress a beverage precursor stored in the basket assembly 170.

Figure 6A:
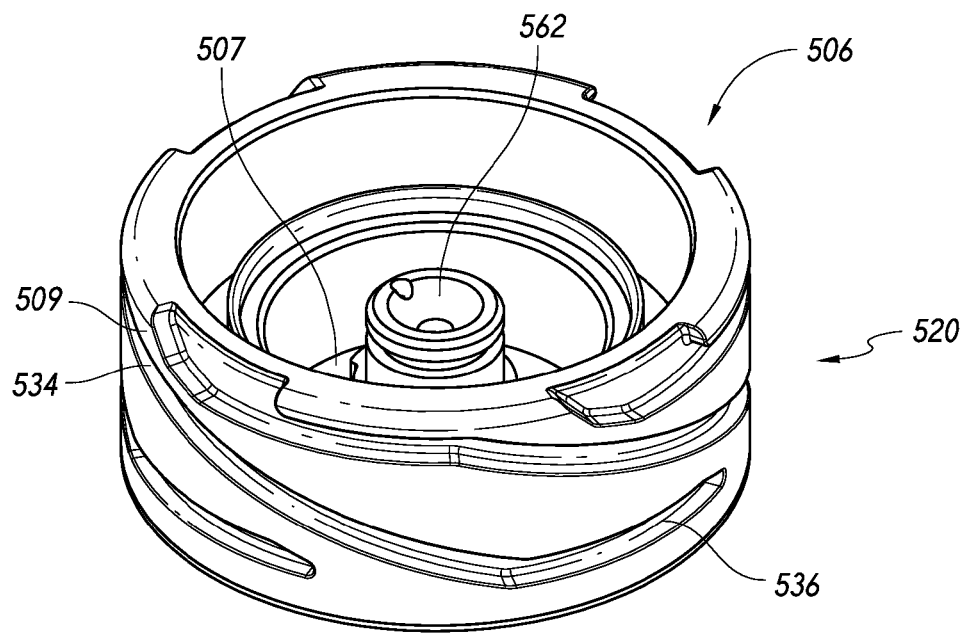
FIG. 6A illustrates a bottom perspective view of a lid cam that can be used in the tamping assembly shown in FIG. 5A.
Figure 6B:
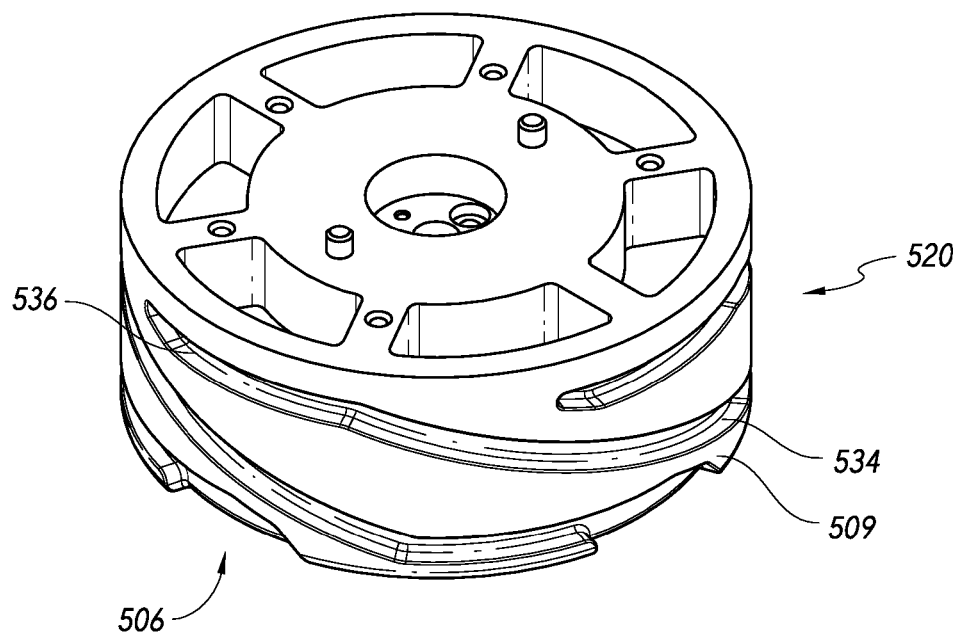
FIG. 6B illustrates a top perspective view of the lid cam shown in FIG. 6A.

FIGS. 6A and 6B illustrate perspective views of the lid cam 506. The lid cam 506 can have a generally cylindrical body with an upper wall portion 507 and a sidewall 509. The upper wall portion 507 can include a fluid inlet 562 through which fluid can flow from a fluid source to the cartridge 180.

As shown in FIG. 5A, the lid cam 506 can also include an annular ledge 530 surrounding a fluid passageway 564. When tamping assembly 500 is in the tamped state, the ledge 530 can form a seal with the cartridge 180 and/or chamber 172. In some embodiments, the cartridge 180 can have an outer rim that can act as an elastomeric gasket between the lid cam 506 and the chamber 172. Advantageously, the seal formed between the lid cam 506 and the chamber 172 can prevent fluid from flowing out of the chamber 172 or around the cartridge 180, rather than through the cartridge 180.

Additionally, as shown in FIG. 5A, a tamp spring 510 can be disposed in an annular channel 548 positioned between the fluid passageway 566 and annular ledge 530. The tamp spring 510 can be generally aligned with (e.g., extend about) a longitudinal axis of the tamping assembly 500 when the tamping assembly 500 is in a latched state or a tamped state. Although not shown, in other embodiments, the tamping assembly 500 can include multiple tamp springs 510.

The sidewall 509 of the lid cam 506 can define a generally hollow chamber 511 for receiving a cartridge 180 and/or the chamber 172 when the tamping assembly 500 is in a latched or tamped state (see FIG. 5A). The sidewall 509 can also define a cam path 520 along an exterior surface of the sidewall 509. As shown in FIG. 6A, the cam path 520 can include an upper cam path region 534 (e.g., for tamped state) and a lower cam path region 536 (e.g., for latched state). For example, as shown in FIG. 6A, the cam path 520 can have a helical path. Although a single cam path 520 is illustrated, multiple cam paths can be imagined for use with a collar having axially displaced cam teeth.

Figure 7A:
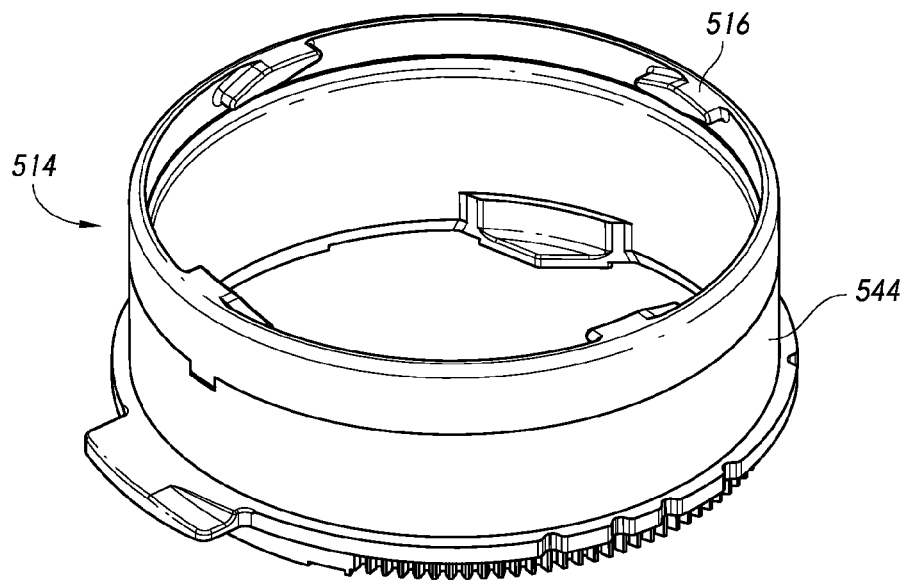
FIG. 7A illustrates a top perspective view of a collar that can be used in the tamping assembly shown in FIG. 5A.
Figure 7B:
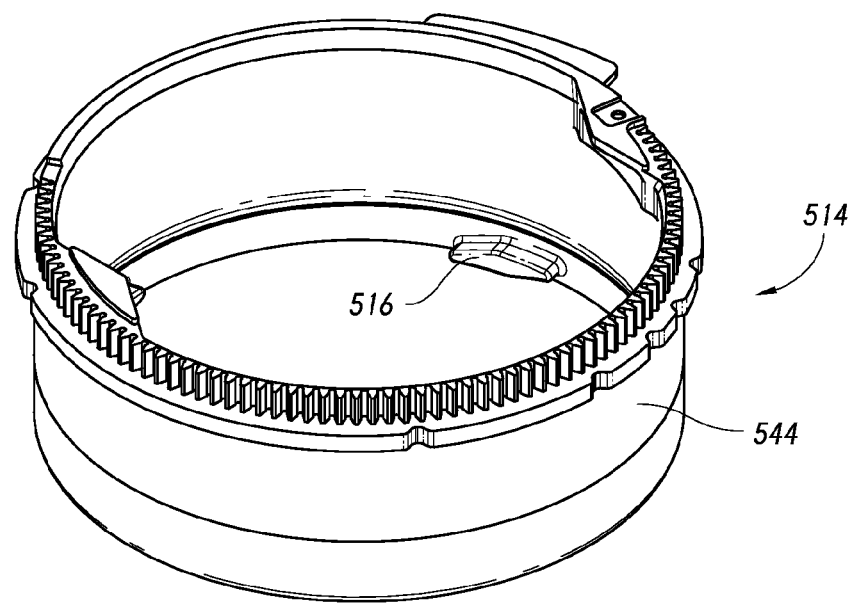
FIG. 7B illustrates a bottom perspective view of the collar shown in FIG. 7A.

FIGS. 7A and 7B illustrate perspective views of a collar 514 that can be generally supported by a framework 125 (see FIG. 1C) and can surround the chamber 172 (see FIG. 5A). The collar 514 can include an annular body 544 and a number of cam teeth 516 (e.g., one, two, three, or more) for engaging the cam path 520 of the lid cam 506. The cam teeth 516 can project radially inward from an upper portion of the annular body 544. Further, the collar 514 can include a multiple number of geared teeth (not shown) projecting radially outward from a lower portion of the annular body 544. The geared teeth can surround at least a portion of the annular body 544 (e.g., at least about 50%, at least about 60%, at least about 70%, at least about 80%, or at least about 90% of the annular body 544). The motor 182 (see FIG. 2A) can interact with the geared teeth to rotate the collar 514 about a longitudinal axis of the tamping assembly 500 in either a clockwise or counterclockwise direction. For example, the motor 182 can rotate the collar 514 at least about 90 degrees and/or less than or equal to about 360 degrees, for example, between about 90 degrees and 120 degrees or between about 120 degrees and 150 degrees, such as about 140 degrees in either direction.

Various methods of forming the lid cam 506 and collar 514 are contemplated. For example, the lid cam 506 can be formed by a molding process, such as injection molding. Further, the lid cam 506 can be constructed from a plastic material, such as Delrin.

Figure 5B:
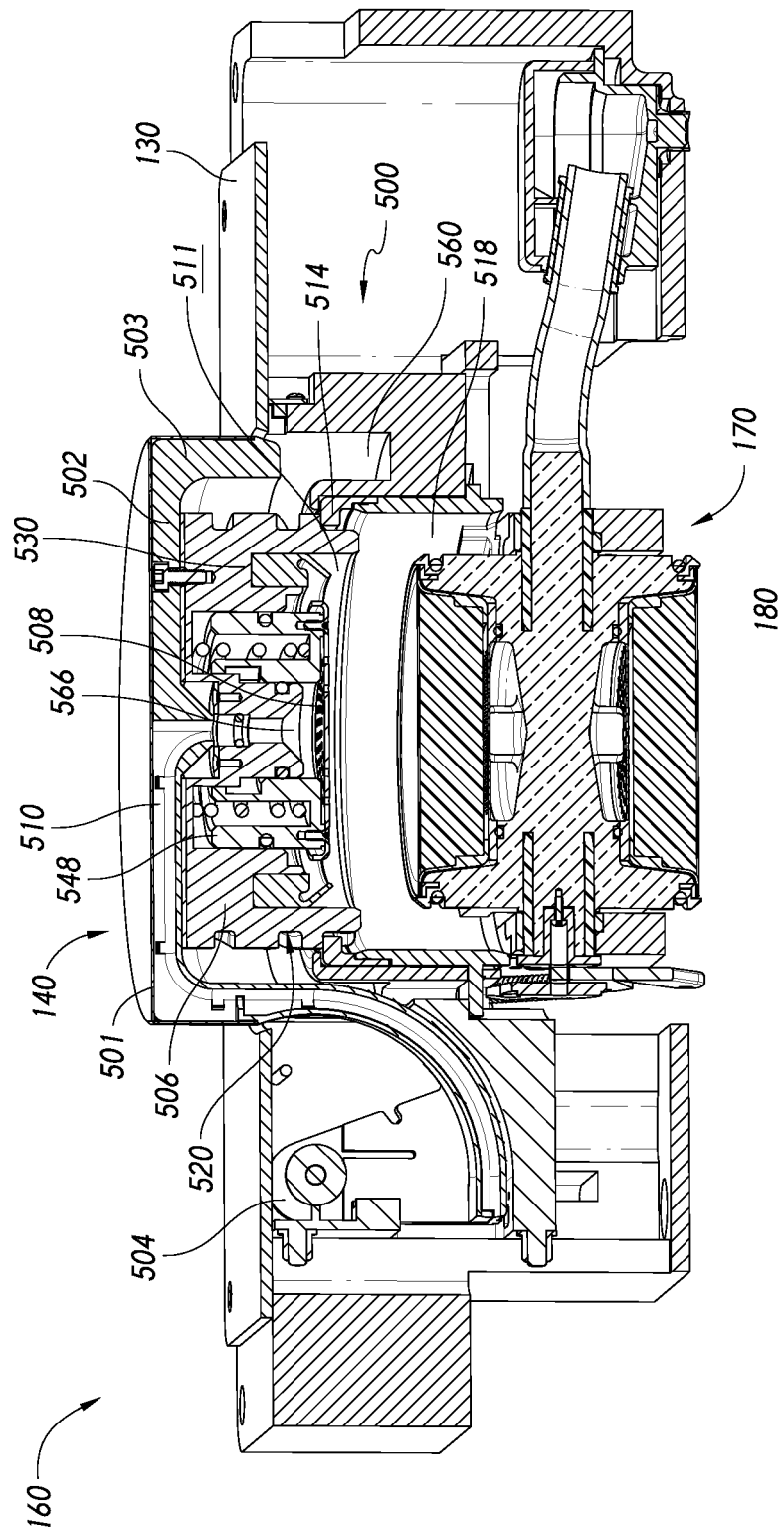
FIG. 5B illustrates a simplified cross-section of the beverage production assembly shown in FIG. 5A with a shorter pathway between the latched state and the tamped state.
Figure 5C:
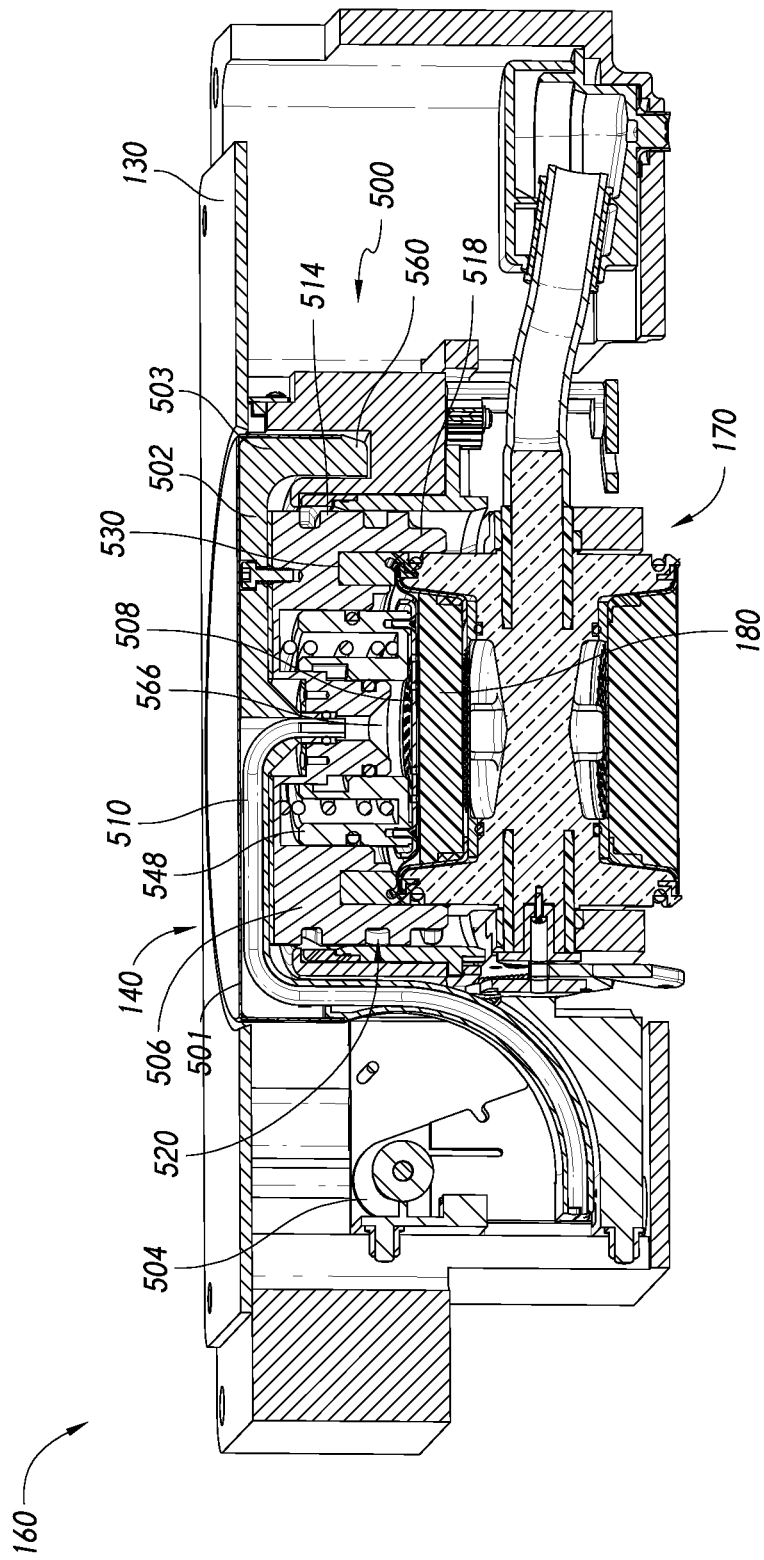
FIG. 5C illustrates the beverage production assembly shown in FIG. 5B with the tamping assembly in a tamped state.

FIGS. 5B and 5C illustrate simplified views of the beverage production assembly 160 shown in FIG. 5A with different dimensions (e.g., a shorter pathway between the latched state and the tamped state).

FIG. 5B illustrates the tamping assembly 500 in the latched state in which the tamp spring 510 can be in an uncompressed state. As the tamping assembly 500 moves to the tamped state (see FIG. 5C), the cam teeth 516 move from the lower cam path 536 to the upper cam path 534. The rotation of the collar 514 can pull the lid cam 506 downward into a collar passageway 518 defined by the collar 514 and the basket chamber 172. As the lid cam 506 moves downward, the lid assembly 140 can be pulled downward, such that the sidewall 503 enters the lid passageway 560 disposed in the framework 125 or other frame structure. Further, as the lid assembly 140 moves downward, the hinge 504 can move downward (e.g., axially translates) along the hinge path 564 until the upper surface of the lid portion 501 is generally flush with a top portion of the beverage preparation machine 130. The hinge path 564 can have a length of less than or equal to about 25 mm, preferably less than or equal to about 15 mm. In the tamped state, the outer rim of the cartridge 180 can be sealed between an upper rim 173 of the chamber 172 and the ledge 530. The upper rim 173 can be generally flat to facilitate the formation of the seal.

Additionally, as the lid cam 506 moves downward, the tamp spring 510 can be compressed such that the tamping surface 508 tamps the cartridge 180 or beverage precursor. The tamp spring 510 can determine the force applied to the beverage precursor. For example, the tamp spring 510 can provide a force of at least about 30 lbf and/or less than or equal to about 50 lbf, such as about 35 lbf, 40 lbf, or 45 lbf.

Although the tamping mechanism 500 described above utilizes a lid cam 506 having a cam path 520 and a collar 514 having cam teeth 516, in an alternate configuration, the lid cam 506 can include a number of cam teeth, while the collar 514 can define the cam path. Further, although FIGS. 6A and 7A illustrate a particular embodiment of the lid cam 506 and the collar 514, in an alternative configuration, the cam path 520 can be disposed along an inner wall of the lid cam 506, and the cam teeth 516 can extend radially outward from the collar 514.

Translating Basket Assembly

With reference to FIGS. 8A and 8B, another illustrative embodiment of a tamping assembly 800 is shown. The tamping assembly 800 resembles or is identical to the tamping assembly 200 discussed above in many respects. Accordingly, numerals used to identify features of the tamping assembly 200 are incremented by six hundred (600) to identify like features of the tamping assembly 800. This numbering convention generally applies to the remainder of the figures. Any component or step disclosed in any embodiment in this specification can be used in other embodiments.

FIG. 8A illustrates another embodiment of a tamping assembly 800 that can be used to compress a beverage precursor contained in a cartridge 180. FIG. 8A illustrates a beverage production assembly 160 with the lid assembly 140 in a closed position and the tamping assembly 800 in the latched state. The lid assembly 140 can move about a hinge 804 to a closed position in which the lid assembly 140 is generally vertically aligned with the basket assembly 170. In some embodiments, the lid portion 140 can be biased to the open position, for example, using a torsion spring. The lid assembly 140 can have a lid portion 802 having a generally planar bottom surface 805 (e.g., flat) that is generally parallel with an upper surface 801 of the lid portion 802. The bottom surface of the lid portion 805 can form a face seal with a ledge 870 of the framework 125 or other frame structure. The ledge 870 can be generally flush with an upper surface of the basket assembly 170 when the basket assembly 170 is in the latched state. Additionally, one or more sealing members (e.g., gaskets, v-seals, or otherwise) can be disposed in the bottom surface of the lid portion 805 to facilitate formation of a seal.

When the lid assembly 140 is in the closed position, a sensor (not shown) (e.g., an optical sensor, a mechanical switch, or a proximity sensor) can detect the presence of the lid portion 802 (e.g., a front edge of the lid) to activate the tamping assembly 800. In some embodiments, when the lid assembly 140 is in the closed position, a latch (not shown) can engage a detent on the front edge of the lid portion 802.

Once the tamping assembly 800 is activated, a motor 182 (see FIG. 2A) can drive a collar 814 to engage a basket cam 806. The tamping assembly 800 may remain in this latched state if a beverage is being brewed that does not require tamping, such as brewed coffee. However, if the beverage preparation machine 100 is being used to brew espresso (or a different beverage requiring tamping), the motor 182 can continue to rotate the collar 814 which in turn can move the basket cam 806 to a tamped state in which a tamping surface 808 (e.g., shower head) compresses the beverage precursor contained in the cartridge 180. A tamping spring (not shown) can be positioned between the tamping surface 808 and the lid portion 802 and can provide the necessary force for the tamping surface 808 to compress a beverage precursor stored in the basket assembly 170.

As shown in FIG. 8A, the tamping assembly 800 can generally include a collar 814 capable of engaging a basket cam 806. The basket cam 806 can fixedly (e.g., by welding or screws) engage the basket assembly 170, while the collar 814 can surround a lower portion of the basket assembly 170.

The basket cam 806 can include any of the features of the lid cam 206 or the lid cam 506. For example, the sidewall of the basket cam 806 can define a cam path 820 along an exterior surface of the sidewall. As shown in FIGS. 8A and 8B, the cam path 820 can include an upper cam path region 834 (e.g., for latched state) and a lower cam path region 836 (e.g., for tamped state). For example, the cam path 820 can have a helical path similar to the cam path 220. Although a single cam path 820 is illustrated, multiple cam paths can be imagined for use with a collar having axially displaced cam teeth.

The collar 814 can include any of the features of the collar 214 or the collar 514. For example, the collar 814 can include an annular body and a number of cam teeth 816 (e.g., one, two, three, or more) for engaging the cam path 820 of the basket cam 806. Further, the collar 814 can include a multiple number of geared teeth (not shown) projecting radially outward from the annular body. The geared teeth can surround at least a portion of the annular body (e.g., at least about 50%, at least about 60%, at least about 70%, at least about 80%, or at least about 90% of the annular body). The motor 182 (see FIG. 2A) can interact with the geared teeth to rotate the collar 814 about a longitudinal axis of the tamping assembly 800 in either a clockwise or counterclockwise direction. For example, the motor 182 can rotate the collar 814 at least about 90 degrees and/or less than or equal to about 360 degrees, for example, between about 90 degrees and 120 degrees or between about 120 degrees and 150 degrees, such as about 140 degrees in either direction.

The collar 814 can be secured to the frame 125. For example, as shown in FIGS. 8A and 8B, the collar 814 can be secured to the frame 125 using a collar retainer 817. The collar retainer 817 can have a sidewall 817a secured to the frame and a lower wall 817b extending radially inward from the sidewall 817a. The collar 814 can include an outward extending flange 815 secured between the frame 125 and the collar retainer 817.

Various methods of forming the basket cam 806 and collar 814 are contemplated. For example, the basket cam 806 can be formed by a molding process, such as injection molding. Further, the lid cam 806 can be constructed from a plastic material, such as Delrin.

FIG. 8A illustrates the tamping assembly 800 in the latched state. As the tamping assembly 800 moves to the tamped state (see FIG. 8B), the cam teeth on the collar 814 move from the upper cam path 834 to the lower cam path 836. The rotation of the collar 814 can move the basket cam 806 upward such that the basket assembly 170 moves upward toward the lid assembly 140. As the basket assembly 170 moves upward, the lid assembly 140 and tamping surface 808 remain stationary. In the tamped state, the outer rim of the cartridge 180 can be sealed between an upper rim 173 of the chamber 172 and the bottom surface of the lid portion 805. The upper rim 173 can be generally flat to facilitate the formation of the seal.

Additionally, as the basket assembly 170 moves upward, the tamp spring can be compressed such that the tamping surface 808 tamps the cartridge 180 or beverage precursor. The tamp spring can determine the force applied to the beverage precursor. For example, the tamp spring can provide a force of at least about 30 lbf and/or less than or equal to about 50 lbf, such as about 35 lbf, 40 lbf, or 45 lbf.

Although the tamping mechanism 800 described above utilizes a basket cam 806 having a cam path 820 and a collar 814 having cam teeth, in an alternate configuration, the basket cam 806 can include a number of cam teeth, while the collar 814 can define the cam path. Further, although FIGS. 8A and 8B illustrate a particular embodiment of the basket cam 806 and the collar 814, in an alternative configuration, the cam path 820 can be disposed along an inner wall of the basket cam 806, and the cam teeth can extend radially outward from the collar 814.

Although the beverage preparation machines described herein have been described herein with respect to coffee, the beverage preparation machines described herein can be configured to receive other particulate materials or components for producing many other types of beverages, such as a chocolate based product (e.g., hot cocoa), tea, juice, and other beverages. Further, although some embodiments have been disclosed in which liquid is introduced into the cartridge, the introduction of other phases is contemplated. For example, in some embodiments, steam or a combination of steam and liquid water is introduced into the cartridge. Additionally, although certain embodiments have been disclosed that include a single beverage component or precursor, the term "beverage component or precursor" is not limited to only a single component. Rather, the beverage component or precursor can comprise one component (e.g., coffee) or a plurality of components (e.g., coffee and a sweetener). Further, although some embodiments have been described for use with a cartridge, the basket assembly can hold loose beverage precursor without a cartridge.

Although this disclosure describes certain embodiments and examples of tamping mechanisms, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensable. Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The language of the claims is to be interpreted broadly based on the language employed in the claims and not limited to the examples described in the present specification or during the prosecution of the application, which examples are to be construed as non-exclusive.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various illustrative embodiments and examples of brewer and tamping assemblies have been disclosed. Although the brewer tamping assemblies have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A machine for preparing single-servings of a beverage, the machine comprising:
    a housing;
    a lid assembly on the top of the housing configured to move between an open configuration to allow insertion of a cartridge containing a beverage precursor and a closed configuration in which the beverage is prepared from the beverage precursor;
    a basket assembly comprising a chamber configured to receive the cartridge containing the beverage precursor; and a lid cam connected to the lid assembly, the lid cam having an upper wall portion, a sidewall, and a cam path disposed along the sidewall, wherein the lid cam translates axially relative to the lid assembly, the lid cam being suspended by at least one lid spring, and the cam path comprises a lower cam path and an upper cam path;

a collar having one or more cam teeth configured to engage the cam path, a tamping surface on the bottom of the lid assembly and connected to the lid cam, wherein when the lid assembly is in the closed configuration, the tamping surface is configured to move between an untamped state in which the tamping surface does not compress the beverage precursor and a tamped state in which the tamping surface compresses the beverage precursor;

wherein the collar is configured to movably engage the lid cam and rotate about a central axis extending longitudinally through the basket assembly, wherein rotation of the collar about the central axis and with respect to the lid cam axially moves the tamping surface so that the tamping surface is closer to the basket assembly in the tamped state than in the untamped state;

wherein in the untamped state, the one or more cam teeth engage the lower cam path, and wherein in the tamped state, the one or more cam teeth engage the upper cam path.

2. The machine of claim 1, wherein the collar further comprises a plurality of geared teeth.

3. The machine of claim 1, wherein the cam path is disposed along an outer surface of the sidewall of the lid cam.

4. The machine of claim 1, wherein the lid cam further comprises a ledge on a bottom surface of the upper wall portion, the ledge configured to form a seal with the basket assembly.

5. The machine of claim 1, wherein the lid cam further comprises one or more projections projecting radially outward from the upper wall portion of the lid cam.

6. The machine of claim 1, wherein the tamping assembly further comprises a tamp spring disposed between the tamping surface and the lid assembly, wherein in the tamped state, the tamp spring is in a compressed state.

7. The machine of claim 6, wherein the spring is configured to provide a force between about 30 lbf and about 50 lbf.

8. The machine of claim 1, wherein the tamping surface comprises a shower head.

9. The machine of claim 1, wherein the lid cam further comprises one or more fluid outlets.

10. A method of compressing a beverage precursor in a beverage preparation machine, wherein the beverage preparation machine comprising a housing; a lid assembly on the top of the housing configured to move between an open configuration to allow insertion of a cartridge containing a beverage precursor and a closed configuration in which the beverage is prepared from the beverage precursor; a basket assembly comprising a chamber configured to receive the cartridge containing the beverage precursor; and a lid cam connected to the lid assembly, the lid cam having an upper wall portion, a sidewall, and a cam path disposed along the sidewall, wherein the lid cam translates axially relative to the lid assembly, the lid cam being suspended by at least one lid spring, and the cam path comprises a lower cam path and an upper cam path; a collar having one or more cam teeth configured to engage the cam path, a tamping surface on the bottom of the lid assembly and connected to the lid cam, wherein when the lid assembly is in the closed configuration, the tamping surface is configured to move between an untamped state in which the tamping surface does not compress the beverage precursor and a tamped state in which the tamping surface compresses the beverage precursor; and wherein the collar is configured to movably engage the lid cam and rotate about a central axis extending longitudinally through the basket assembly, wherein rotation of the collar about the central axis and with respect to the lid cam axially moves the tamping surface so that the tamping surface is closer to the basket assembly in the tamped state than in the untamped state; wherein in the untamped state, the one or more cam teeth engage the lower cam path, and wherein in the tamped state, the one or more cam teeth engage the upper cam path, the method comprising moving the lid assembly from the open configuration to the closed configuration;

engaging the one or more cam teeth disposed on the collar with the cam path on the lid cam; and moving the tamping surface from the untamped state to the tamped state, wherein moving the tamping surface comprises:

rotating the collar such that the one or more cam teeth move from the lower cam path to the upper cam path;

moving the lid cam away from the lid assembly; and moving the tamping surface toward the beverage precursor.

11. The method of claim 10, wherein rotating the collar comprises driving a plurality of geared teeth disposed on the collar using a motor.

12. The method of claim 10, wherein moving the lid cam away from the lid assembly comprises pulling at least one spring from a compressed state to an elongated state.

13. The method of claim 10, wherein moving the tamping surface comprises compressing a spring disposed between the tamping surface and the lid assembly.

14. The method of claim 10, wherein moving the tamping surface comprises moving the tamping surface less than or equal to about 5.0 mm.

15. The method of claim 10, wherein moving the tamping surface comprises applying a force between about 30 lbf and about 50 lbf on the beverage precursor.

16. The method of claim 10, wherein the lid assembly remains stationary when moving the tamping surface from the untamped state to the tamped state.

* * * * *